United States Patent
Chang et al.

(10) Patent No.: US 11,178,145 B2
(45) Date of Patent: Nov. 16, 2021

(54) NETWORK APPARATUS AND CONTROL METHOD THEREOF

(71) Applicant: SAMSUNG ELECTRONICS CO., LTD., Suwon-si (KR)

(72) Inventors: Sejung Chang, Suwon-si (KR); Daewon Seo, Suwon-si (KR); Bongsung Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 16/299,991

(22) Filed: Mar. 12, 2019

(65) Prior Publication Data
US 2019/0312866 A1    Oct. 10, 2019

(30) Foreign Application Priority Data

Apr. 5, 2018    (KR) .......................... 10-2018-0040002

(51) Int. Cl.
| | |
|---|---|
| *H04L 29/12* | (2006.01) |
| *G06F 21/31* | (2013.01) |
| *H04L 29/06* | (2006.01) |
| *H04L 29/08* | (2006.01) |
| *H04W 12/08* | (2021.01) |
| *G06F 21/62* | (2013.01) |

(52) U.S. Cl.
CPC ...... *H04L 63/0876* (2013.01); *H04L 63/0807* (2013.01); *H04L 63/0853* (2013.01); *H04L 63/102* (2013.01); *H04L 67/303* (2013.01); *H04W 12/08* (2013.01)

(58) Field of Classification Search
None
See application file for complete search history.

(56) References Cited

U.S. PATENT DOCUMENTS

| | | |
|---|---|---|
| 9,325,696 B1 | 4/2016 | Balfanz et al. |
| 9,723,003 B1 | 8/2017 | McClintock et al. |
| (Continued) | | |

FOREIGN PATENT DOCUMENTS

EP    2747374 A1    6/2014

OTHER PUBLICATIONS

Group-Based Authentication and Key Agreement. Chen. Springer (Year: 2012).*

(Continued)

*Primary Examiner* — Venkat Perungavoor
(74) *Attorney, Agent, or Firm* — Sughrue Mion, PLLC

(57) ABSTRACT

Disclosed is a network apparatus and a control method thereof. The network apparatus includes: a memory and a processor, which creates a first account based on a request for creating a new account from a first user device, associates first authentication information with the first account and store the first authentication information in association with the first account in the memory, the first authentication information being information received from the first user device for authentication with a first service provider server, allows a second user device connected to the network apparatus using the first account to access the first authentication information associated with the first account in the memory, and facilitates the second user device to perform authentication with the first service provider server based on the first authentication information.

20 Claims, 22 Drawing Sheets

(56) References Cited

U.S. PATENT DOCUMENTS

| | | | |
|---|---|---|---|
| 10,148,641 B2* | 12/2018 | Iwanski | H04L 67/02 |
| 2008/0104239 A1* | 5/2008 | Lipinski | H04L 12/66 |
| | | | 709/225 |
| 2011/0010542 A1 | 1/2011 | Choi et al. | |
| 2013/0111550 A1 | 5/2013 | Naveh et al. | |
| 2013/0174223 A1* | 7/2013 | Dykeman | G06F 21/10 |
| | | | 726/4 |
| 2014/0033277 A1 | 1/2014 | Xiao et al. | |
| 2015/0128237 A1* | 5/2015 | Lund | H04L 9/3213 |
| | | | 726/7 |
| 2016/0021089 A1* | 1/2016 | Adams | H04L 67/306 |
| | | | 726/9 |
| 2016/0134488 A1 | 5/2016 | Straub et al. | |
| 2017/0064550 A1* | 3/2017 | Sundaresan | H04L 63/105 |
| 2017/0094079 A1* | 3/2017 | Watanabe | H04N 1/00344 |
| 2017/0257750 A1 | 9/2017 | Gunasekara et al. | |
| 2017/0272468 A1 | 9/2017 | Chechani | |
| 2018/0006818 A1 | 1/2018 | Ren | |
| 2018/0218446 A1* | 8/2018 | Ries | G06Q 40/02 |
| 2019/0166126 A1* | 5/2019 | Lazarovitz | H04L 63/102 |

OTHER PUBLICATIONS

Smartphone-based secure authenticated session sharing in Internet of Personal Things. Krishnan. SPIE. (Year: 2015).*

Access Control on Internet of Things based on Publish/Subscribe using Authentication Serverand Secure Protocol. Wardana. IEEE. (Year: 2018).*

Internet authentication and billing (hotspot) system using MikroTik router operating system. Saliu.SciencePG. (Year: 2013).*

CN106254509. English Translation. Cao. (Year: 2016).*

International Search Report (PCT/ISA/210) and Written Opinion (PCT/ISA/237) dated May 22, 2019 issued by the International Searching Authority in International Application No. PCT/KR2019/001972.

Communication dated Aug. 28, 2019, from the European Patent Office in counterpart European Application No. 19159267.4.

* cited by examiner

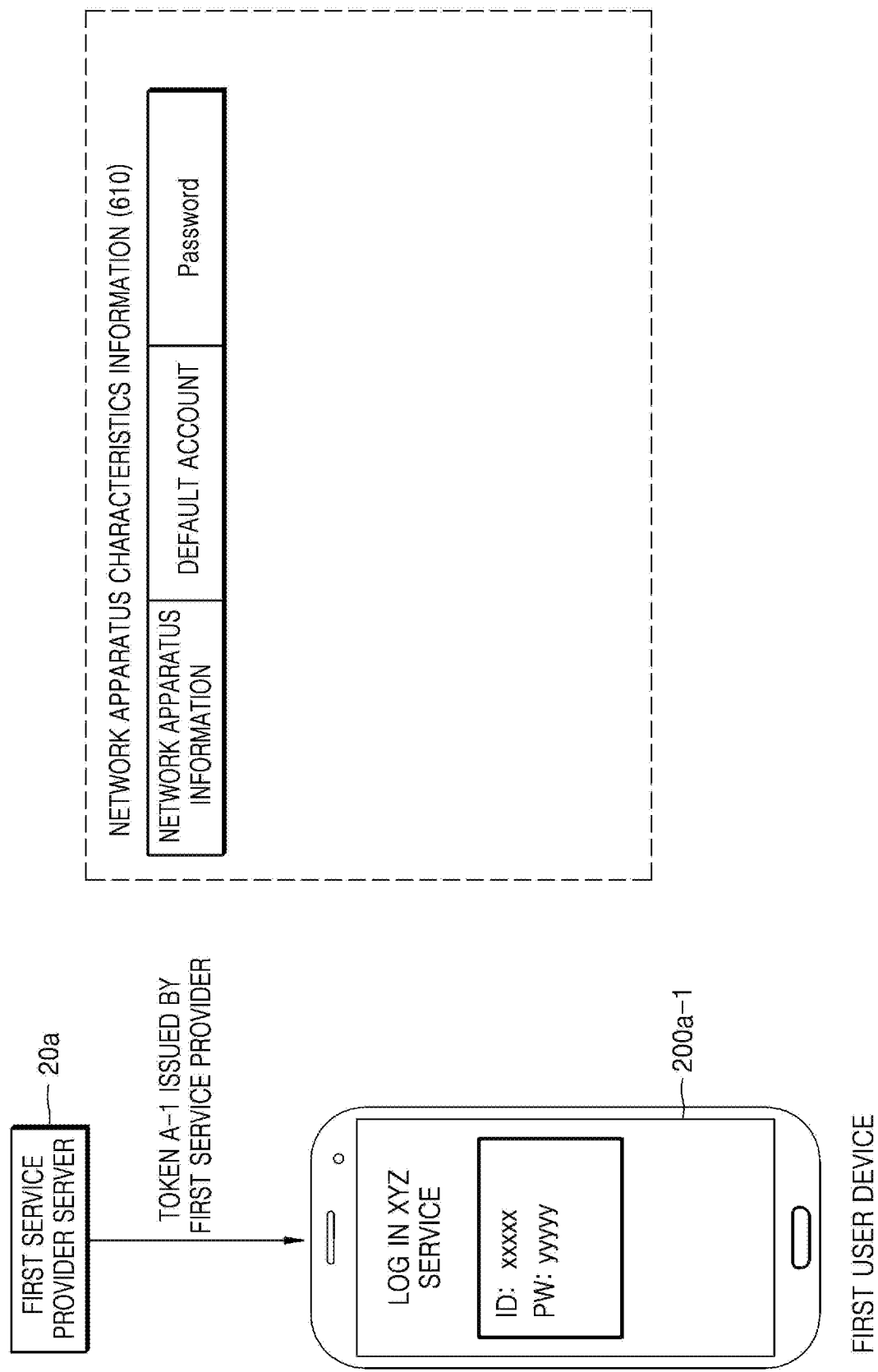

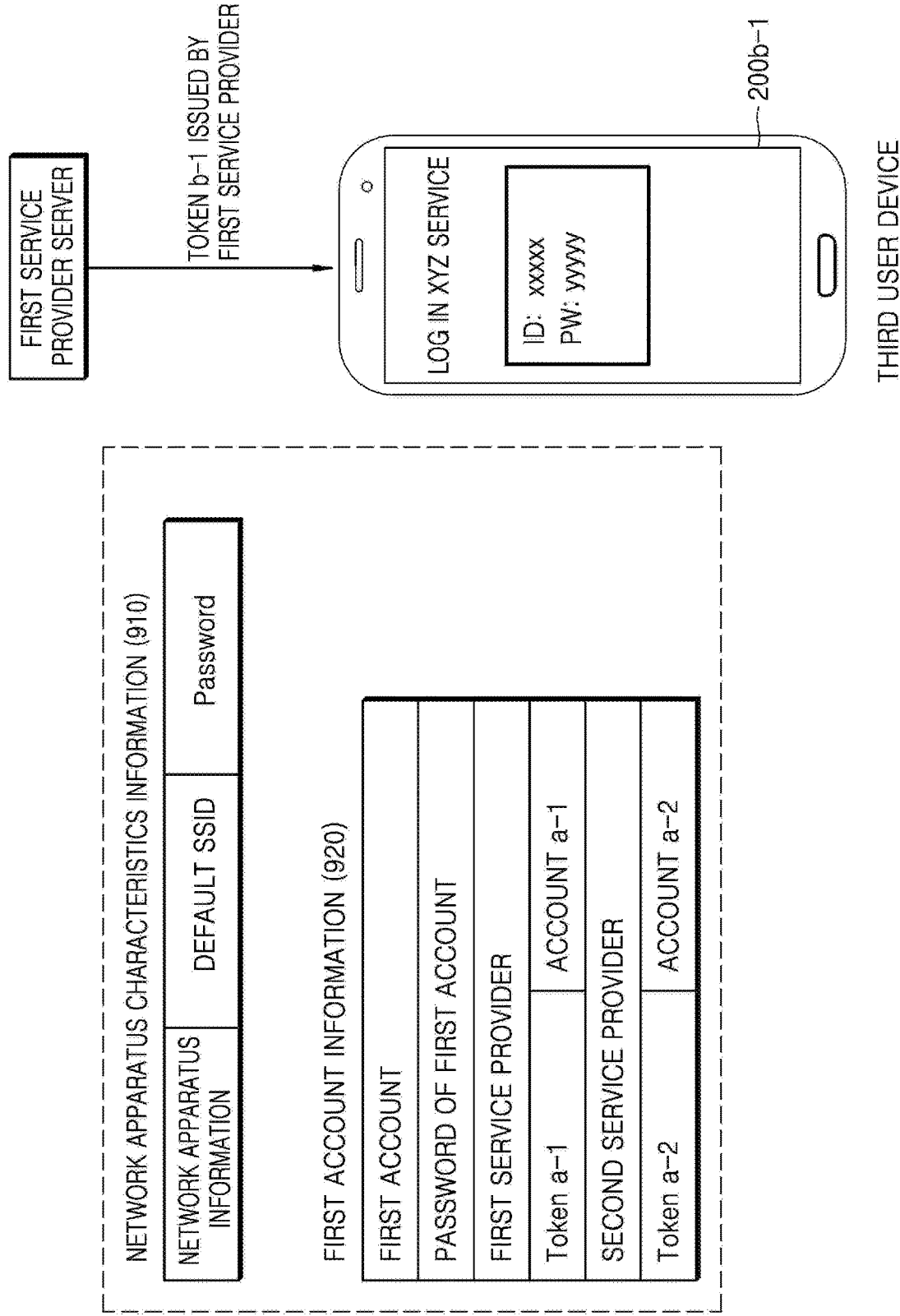

FIG. 9E
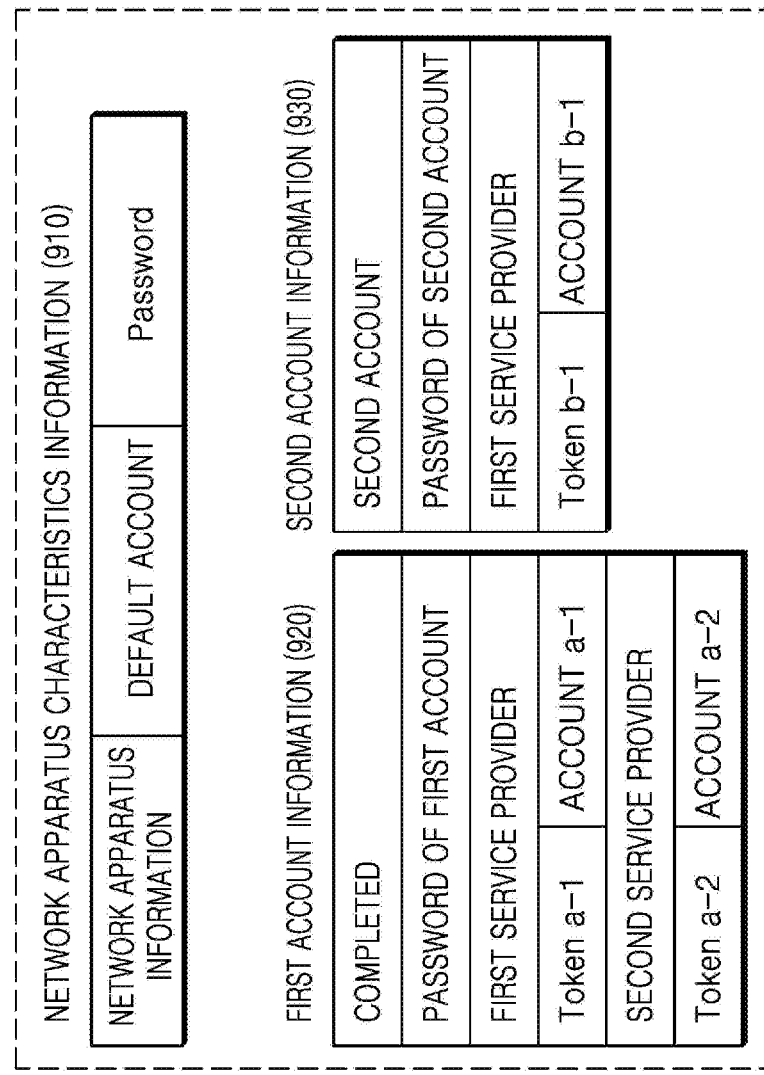
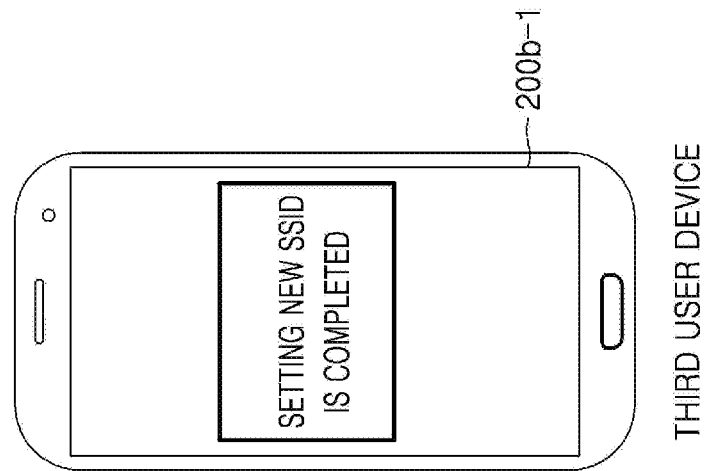

NETWORK APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0040002, filed on Apr. 5, 2018, in the Korean Intellectual Property Office, the disclosure of which is incorporated by reference herein in its entirety.

BACKGROUND

1. Field

The disclosure relates to a network apparatus and a control method thereof, and more particularly, to a network apparatus providing account information.

2. Description of Related Art

Various network infrastructure apparatuses such as an Access Point (AP), a router, etc., are used to transmit data between communication networks operating based on different protocols.

For example, a router is used as a network apparatus for connecting an internal network (i.e., a home network) with an external network (i.e., a public network). The router performs various communication network management functions, such as controlling communication flow and configuring various secondary communication networks in a communication network, in addition to a function for connecting communication networks. Also, the router allows only authorized devices to transmit data through a local network. Recently, as home appliances using network services are increasing, use of routers in homes, as well as in public networks is also increasing.

When a router is used in a public network or a home network, the router allows only users with access authority through a Service Set Identifier (SSID) and a password to gain access.

SUMMARY

Various embodiments provide a method and apparatus for simplifying an authentication process between a service provider and a device through a network apparatus.

Also, various embodiments provide a method and apparatus for distinctly managing users' authentication information by setting different accounts for the individual users using a network apparatus.

Additional aspects will be set forth in part in the description which follows and, in part, will be apparent from the description, or may be learned by practice of the presented embodiments.

According to an aspect of the disclosure, there is provided a network apparatus comprising: a memory configured to store one or more instructions, and a processor configured to execute the one or more instructions stored in the memory to: create a first account based on a request for creating a new account from a first user device, associate first authentication information with the first account and store the first authentication information in association with the first account in the memory, the first authentication information being information received from the first user device for authentication with a first service provider server, allow a second user device connected to the network apparatus using the first account to access the first authentication information associated with the first account in the memory, and facilitate the second user device to perform authentication with the first service provider server based on the first authentication information.

The processor is further configured to execute the one or more instructions to allow the second user device to access data associated the first account among data stored in the memory based on the second user device being connected to the network apparatus using the first account.

The processor is further configured to execute the one or more instructions to facilitate the first user device and the second user device to connect to an external network.

The processor is further configured to execute the one or more instructions to: facilitate connection with the first user device using the first account, receive, from the first user device, second authentication information for authentication with a second service provider, and associate the second authentication information with the first account and store the second authentication in association with the first account in the memory.

The processor is further configured to execute the one or more instructions to transmit the first authentication information associated with the first account to the second user device based on a request from the second user device using the first account.

The processor is further configured to execute the one or more instructions to: facilitate a connection with a third user device using a default account, create a second account based on a request for creating a new account is received from the third user device, and associate third authentication information with the second account and store the third authentication information in association with the second account in the memory, the third authentication information being information received from the third user device for authentication with the first service provider server, and wherein the third user device is connected to the network apparatus using the second account.

The processor is further configured to execute the one or more instructions to: facilitate a connection with the third user device using the second account, and transmit the third authentication information to the third user device, in response to a log-in request for logging in the first service provider server from the third user device.

The processor is further configured to execute the one or more instructions to allow the third user device, which is connected to the network apparatus through the second account, to access data associated with the second account among data stored in the memory.

The processor is further configured to: receive new first authentication information for authentication with the first service provider server from the first user device connected to the network apparatus using the first account, and update the first authentication information with the new first authentication information and store the updated first authentication information in the memory.

The memory is further configured to store information corresponding to the first account, information corresponding to first service provider associated with the first service provider server, user identification information for authentication with the first service provider server, information corresponding to the network apparatus, and information about data access authority of the first service provider.

According to another aspect of the disclosure, there is provided a method performed by a network apparatus, the method comprising: creating a first account based on a request for creating a new account from a first user device, associating first authentication information with the first account and storing the first authentication information in association with the first account in a memory, the first authentication information being information received from the first user device for authentication with a first service provider server, allowing a second user device connected to the network apparatus using the first account to access the first authentication information associated with the first account in the memory, and facilitating the second user device to perform authentication with the first service provider server based on the first authentication information.

The method further comprising: allowing the second user device to access data associated with the first account among data stored in the memory based on the second user device being connected to the network apparatus using the first account.

The method further comprising: facilitating the first user device to connect to an external network, and facilitating the second user device to connect to the external network.

The method further comprising: facilitating the first user device to connect to the network apparatus using the first account, receiving, from the first user device, second authentication information for authentication with a second service provider, and associating the second authentication information with the first account and storing the second authentication information in association with the first account in the memory.

The facilitating of the second user device to perform the authentication with the first service provider server by using the first authentication information comprises transmitting the first authentication information associated with the first account to the second user device based on a request from the second user device using the first account.

The method further comprising: facilitating a third user device to connect to the network apparatus using a default account, creating a second account based on a request for creating a new account is received from the third user device, and associating third authentication information with the second account and storing the third authentication information in association with the second account in the memory, the third authentication information being information received from the third user device for authentication with the first service provider server, and wherein the third user device is connected to the network apparatus using the second account.

The method further comprising: facilitating the third user device to connect to the network apparatus using the second account, and transmitting the third authentication information to the third user device, in response to a request from the third user device.

The method further comprising: allowing the third user device, which is connected to the network apparatus through the second account, to access data associated with the second account among data stored in the memory.

The method further comprising: receiving new first authentication information for authentication with the first service provider server from the first user device connected to the network apparatus using the first user account, and updating the first authentication information with the new first authentication information and storing store the updated first authentication information in the memory.

According to another aspect of the disclosure, there is provided a computer-readable recording medium having stored thereon a computer program to execute the method on a computer.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A to 6E are views for describing a process in which a user device connects to a network apparatus to create a new account according to an embodiment;

FIGS. 9A to 9E are views for describing a process in which a user device connects to a network apparatus to create a new account according to another embodiment;

DETAILED DESCRIPTION

Figure 1:
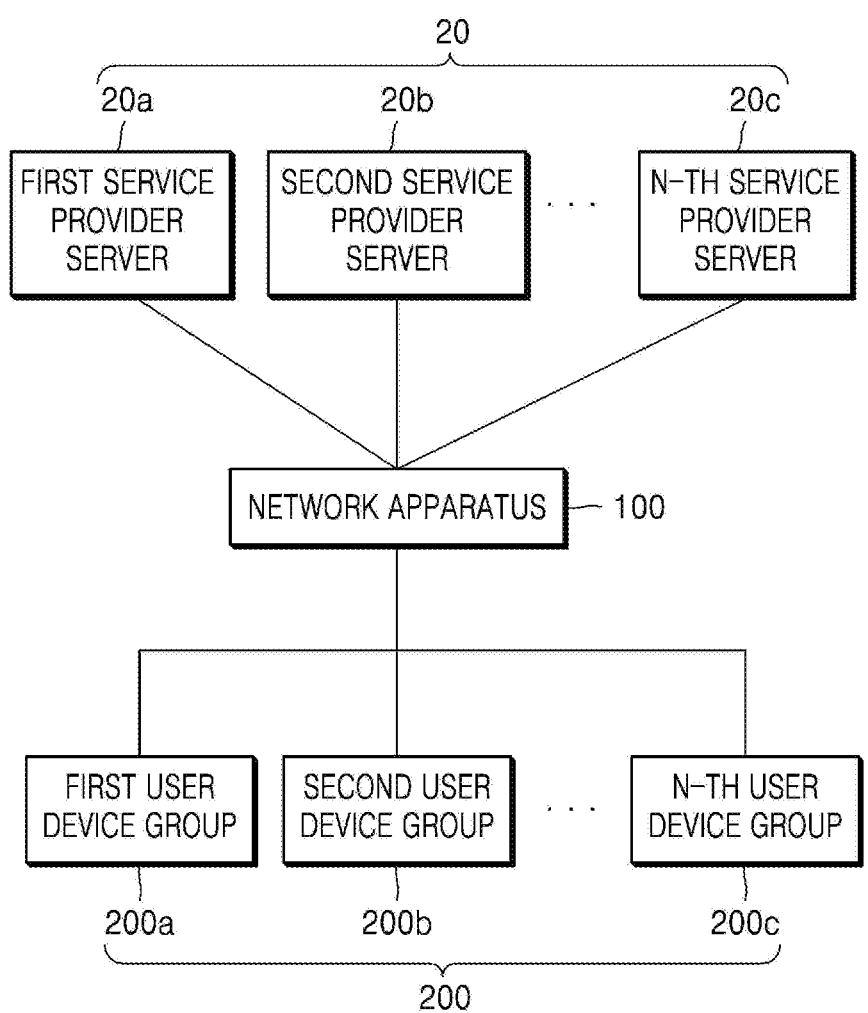
FIG. 1 is a schematic view for describing an operation of a system using a network apparatus according to an embodiment.

Terms used in this specification will be briefly described, and the disclosure will be described in detail.

Although general terms being widely used in the disclosure were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings need to be given in the detailed description of the present invention. Hence, the terms must be defined based on the meanings of the terms and the contents of the entire specification, not by simply stating the terms themselves.

It will be understood that when the terms "includes," "comprises," "including," and/or "comprising," when used in this specification, specify the presence of stated elements and/or components, but do not preclude the presence or addition of one or more elements and/or components thereof. Expressions such as "at least one of," when preceding a list of elements, modify the entire list of elements and do not modify the individual elements of the list. For example, the expression, "at least one of a, b, or c," should be understood as including only a, only b, only c, both a and b, both a and c, both b and c, or all of a, b, and c. As used herein, the terms "part", "module", or "unit" refers to a unit that can perform at least one function or operation, and may be implemented as a software or hardware component or as a combination of software and hardware.

An application means software executed on an Operating System (OS) for display apparatus, OS for computer, or mobile OS for mobile device or OS for another device to be used by users. An application (for example, an application enabling setting of a P2P operating channel) according to an embodiment of the disclosure may mean software that may be executed on a display apparatus, a mobile device, or an external device (for example, a server, etc.) connected in a wireless or wired fashion to the mobile device. The application (for example, the application enabling setting of the P2P operating channel) according to an embodiment of the disclosure may mean software to enable an installed display apparatus to control functions or operations of an external device (for example, a server, a mobile device, etc.) connected in a wireless or wired fashion thereto. Also, software corresponding to setting of a P2P operating channel according to an embodiment of the disclosure may be implemented as OS, an application, firmware, etc.

Hereinafter, embodiments will be described in detail with reference to the accompanying drawings so that the disclosure may be readily implemented by one of ordinary skill in the art to which the disclosure belongs. However, the disclosure is not restricted by these embodiments but can be implemented in many different forms. In the drawings, parts irrelevant to the description are omitted for the simplicity of explanation, and like reference numerals will refer to like components throughout this specification.

In the embodiments of the present specification, the term "user" may indicate a person that connects to a network using a user device, and may include a viewer, a manager, or an installation engineer.

FIG. 1 is a schematic view for describing an operation of system using a network apparatus according to an embodiment.

A network apparatus 100 may be an apparatus that connects a user device 200 to a service provider server 20 to enable the user device 200 to transmit/receive data to and from the service provider server 20. For example, the network apparatus 100 may be connected to the user device 200 through an internal network. Also, the network apparatus 100 may allow access of the user device 200 having authority of use of the network apparatus 100 through an account and a password in order to transmit data to the user device 200 through the internal network.

The user device 200 may receive a service from the service provider server 20 through the network apparatus 100. The user device 200 receiving a service through the network apparatus 100 may mean that communications between the user device 200 and the service provider server 20 are performed through the network apparatus 100.

The user device 200 may be configured with a plurality of user device groups 200a, 200b, and 200c. Each user device group may include at least one device that is used by the same user. For example, the plurality of user device groups 200a, 200b, and 200c may include a first user device group 200a, a second user device group 200b, and an n-th user device group 200c.

The user device 200 according to an embodiment is an electronic device capable of receiving data from the service provider server 20 or installing and executing an application received from the service provider server 20. The user device 200 may include a plurality of devices that can connect to a network through the network apparatus 100 to communicate with the service provider server 20. The user device 200 may include various kinds of electronic devices, such as a television (TV), a Personal Computer (PC), a tablet, a laptop computer, a smart phone, Personal Digital Assistants (PDA), Portable Multimedia Player (PMP), navigation, a MP3 player, a digital camera, a refrigerator, a washing machine, or a cleaner. However, the user device 200 is not limited to the above-mentioned devices, and the user device 200 may include a wearable device having a communication function and a data processing function.

According to an embodiment, the network may mean a connection established (or formed) using a communication method, and may include a communication network that transmits and receives data between user devices or between a user device and a service provider server. The communication method may be a predetermined communication method.

The communication method may include a communication method such as communications through a communication standard, a frequency band, a protocol, or a channel. The communication method may be a predetermined communication method, which includes communications through a predetermined communication standard, a predetermined frequency band, a predetermined protocol, or a predetermined channel For example, the communication method may include Bluetooth, Bluetooth Low Energy (BLE), Wireless-Fidelity (Wi-Fi), Zigbee, 3Generation (3G), Long Term Evolution (LTE), or ultrasonic communications, and also include long-range communications, short-range communications, wireless communications, or wired communications, although not limited to these examples.

According to an embodiment, the long-range communications may mean a communication method by which a device can perform communications regardless of distance. For example, the long-range communications may mean a communication method by which two devices performing communications through a repeater such as Access Point (AP) can communicate with each other even when they are far away from each other more than a predetermined distance. The long-range communications may include a communication method using a cellular network (3G, LTE), such as Short Message Service (SMS) or phone calls. The short-range communications may mean a communication method by which devices (terminals or servers) performing communications can communicate with each other only when they are within a predetermined range with respect to each other. For example, the short-range communications may include Bluetooth, Near Field Communication (NFC), etc., although not limited thereto.

The service provider server 20 may include a plurality of service provider servers 20a, 20b, and 20c. The plurality of service provider servers 20a, 20b, and 20c may provide various services to the user device groups 200a, 200b, and 200c logged-in through user authentication.

For example, the first user device group 200a may perform user authentication through a first account to receive a service from one of the plurality of service provider servers 20a, 20b, and 20c, the second user device group 200b may perform user authentication using a second user account to receive a service from one of the plurality of service provider servers 20a, 20b, and 20c, and the n-th user device group 200c may perform user authentication using a n-th user account to receive a service from one of the plurality of service provider servers 20a, 20b, and 20c. A user authentication method may be one of various methods including a user account, a user identifier (ID), a password, face recognition, fingerprint recognition, bio-information recognition such as iris recognition, etc.

Figure 2:
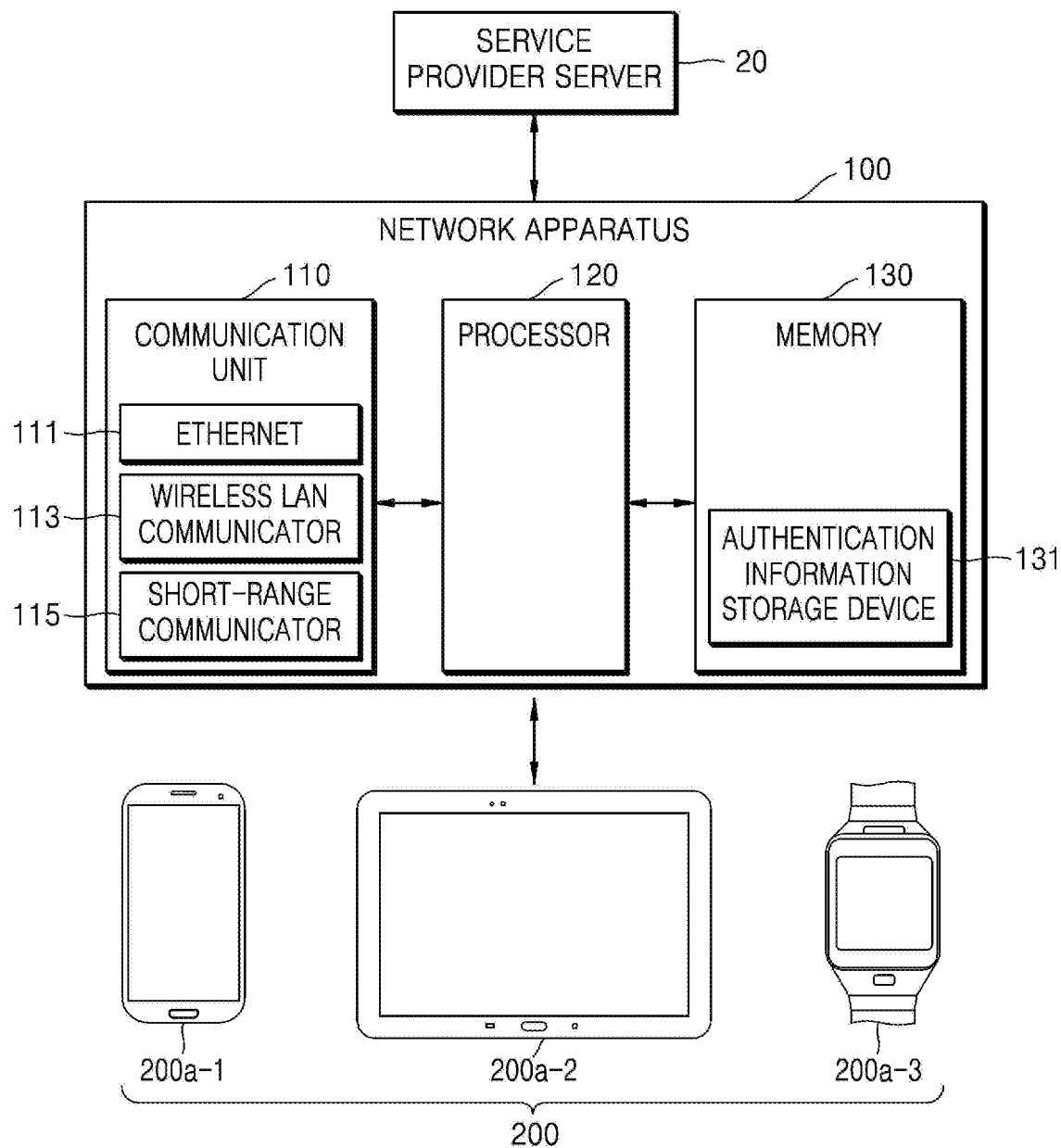
FIG. 2 is a block diagram showing a detailed configuration of a network apparatus according to an embodiment.

FIG. 2 is a block diagram showing a detailed configuration of a network apparatus according to an embodiment.

The network apparatus 100 according to an embodiment may include a communication unit 110, a processor 120, and a memory 130.

The communication unit 110 may enable wired/wireless communications between the user device 200 and the service provider server 20 under the control of the processor 120. Also, the communication unit 110 may receive data of the user device 200 transmitted from the user device 200 under the control of the processor 120.

The user device 200 may be a first user device 200a-1, a second user device 200a-2 and a third user device 200a-3. The first user device 200a-1 may be mobile terminal, the second user device 200a-2 may be display apparatus and the third user device 200a-3 may be a wearable device.

The communication unit 110 may include at least one of wired Ethernet 111, a wireless LAN communicator 113, or a short-range communicator 115 in correspondence to the performance and structure of the network apparatus 100.

The wired Ethernet 111 may be a configuration for enabling communications between the user device 200 and the service provider server 20 through a short-range communication network. When the user device 200 communicates with the service provider server 20 through the wired Ethernet 111, the user device 200 may transmit/receive data to/from the service provider server 20 using a media access control (MAC) address. The wireless LAN communicator 113 may be a configuration for performing Wi-Fi or Wi-Fi Direct communications with the user device 200. The short-range communicator 115 may use Bluetooth communications, BLE communications, Infrared Data Association (IrDA) communications, Ultra-Wideband (UWB) communications, Magnetic Security Transmission (MST) communications, Near Field Communication (NFC), etc.

The processor 120 may execute one or more instructions stored in the memory 130.

According to an embodiment, when the processor 120 receives a request for creating a new account from a first user device 200a-1, the processor 120 may create a first account.

Also, when the processor 120 receives first authentication information for authentication in a first service provider server 20a included in the service provider server 20 from the first user device 200a-1, the processor 120 may associate the first authentication information with the first account, and store the first authentication information associated with the first account in the memory 130.

Also, the processor 120 may control a second user device 200a-2 to connect to the network apparatus 100 through the first account. When the second user device 200a-2 is connected to the network apparatus 100 through the first account, the processor 120 may allow the second user device to access the first authentication information associated with the first account and stored in the memory 130.

The processor 120 may facilitate the second user device 200a-2 to perform authentication in the first service provider server 20a using the first authentication information. According to an embodiment, the processor 120 may control the second user device 200a-2 to perform authentication in the first service provider server 20a using the first authentication information.

The processor 120 may allow the second user device 200a-2 connected to the network apparatus 100 through the first account to search for authentication information corresponding to the service provider server 20 and associated with the first account. The processor 120 may transmit the found first authentication information to the second user device in response to a request from the second user device.

When the second user device 200a-2 is connected to the network apparatus 100 through the first account, the processor 120 may allow the second user device 200a-2 to access data associated with the first account among data stored in the memory 130.

The processor 120 may facilitate the first user device 200a-1 and the second user device 200a-2 to connect to an external network. For example, the processor 120 may control data transmission/reception between user devices 200a-1 and 200a-2 and service provider servers 20 through an external network.

The processor 120 may transmit the first authentication information to the second user device 200a-2, in response to a request for logging in the first service provider server 20a from the second user device 200a-2.

According to an embodiment, when there is the first authentication information associated with the first account, the processor 120 may transmit the first authentication information to the second user device 200a-2 according to the request from the second user device 200a-2.

Also, the processor 120 may facilitate the first user device 200a-1 to connect to the network apparatus 100 through a default account, and when the processor 120 receives first authentication information from the first user device 200a-1 logged in the first service provider server 20a, the processor 120 may create a first account corresponding to a first account.

The first user device 200a-1 according to an embodiment may be one of a plurality of devices that connect to the first service provider server 20a using the first account.

Also, the processor 120 may facilitate the first user device 200a-1 to connect to the network apparatus 100 through the first account, and receive second authentication information for authentication in a second service provider server 20b included in the service provider server 20 from the first user device 200a-1. The processor 120 may associate the second authentication information to the first account and store the second authentication information associated with the first account in the memory 130.

The processor 120 may store a password corresponding to the first account, a user account for connecting to the service provider server 20, and authentication information acquired by logging in the service provider server 20 using the user account, together with the first account, in the memory 130. For example, the processor 120 may store first authentication information acquired from the first service provider server 20a, and second authentication information acquired from the second service provider server 20b, together with the first account, in the memory 130.

The processor 120 according to an embodiment may facilitate the second user device 200a-2, the second user being different from the first user, to connect to the network apparatus 100 through a default account. The second user may be a user who connects to the network apparatus 100 for the first time.

The processor 120 may control a third user device to connect to the network apparatus 100 through a default account, and when the processor 120 receives a request for creating a new account from the third user device, the processor 120 may create a second account. When the processor 120 receives third authentication information for authentication with the first service provider server 20a from the third user device connected to the network apparatus 100 through the second account, the processor 120 may connect the third authentication information to the second account, and store the third authentication information associated with the second account in the memory 130.

The processor 120 according to an embodiment may facilitate the third user device to connect to the network apparatus 100 through the second account. The processor 120 may transmit the third authentication information stored in the memory 130 to the third user device, in response to a request for logging in the first service provider server 20*a* from the third user device.

Also, when the third user device is connected to the network apparatus 100 through the second account, the processor 120 according to an embodiment may allow the third user device to access data associated with the second account among data stored in an authentication information storage device 131 of the memory 130.

The memory 130 according to an embodiment may store one or more instructions that are executed by the processor 120. For example, the memory 130 may store various data and programs for driving and controlling the network apparatus 100, under the control of the processor 120. Also, the memory 130 may store signals or data that is input/output in correspondence to driving of the communication unit 110 and the processor 120.

The memory 130 may store characteristics information of the network apparatus 100 under the control of the processor 120. The characteristics information may include information about the network apparatus 100, a default account of the network apparatus 100, or a password corresponding to the default account.

Also, the memory 130 may include the authentication information storage device 131. The authentication information storage device 131 may receive authentication information issued by the service provider server 20 from the user device 200 and store the authentication information, under the control of the processor 120.

The authentication information storage device 131 may store the first account, and connect the password corresponding to the first account, the first account, and authentication information acquired by logging in the service provider server 20 to the first account to store the information associated with the first account.

The authentication information may be an authentication token for authenticating that the user device 200 trying to log in the service provider server 20 is a device of a user who uses the first account.

For example, the authentication information may include user account information and information about the user device 200. Also, the authentication information may include at least one of the user's country information, validity date information, or authority of access to data included in the user account information.

The service provider server 20 may determine whether to allow the user device 200 to access the service provider server 20, based on data included in the authentication information or encrypted data stored in the authentication information.

When the first user device is connected to the network apparatus through the first account, the processor 120 according to an embodiment may allow the first user device to access data associated with the first account among data stored in the authentication information storage device 131 of the memory 130.

The processor 120 according to an embodiment may facilitate the first user device to connect to the network apparatus 100 through the first account, and receive first authentication information created by the first service provider server 20*a* from the first user device.

When the first authentication information associated with the first account has already been stored in the memory 130, the processor 120 may update the first authentication information, and store the updated first authentication information in the memory 130. The processor 120 may compare validity date of the first authentication information stored in advance with validity date of the newly issued first authentication information, and when the processor 120 determines that the validity date of the existing first authentication information is shorter than the validity date of the newly issued first authentication information, the processor 120 may update the existing first authentication information to the newly issued first authentication information having the longer validity date.

Figure 3:
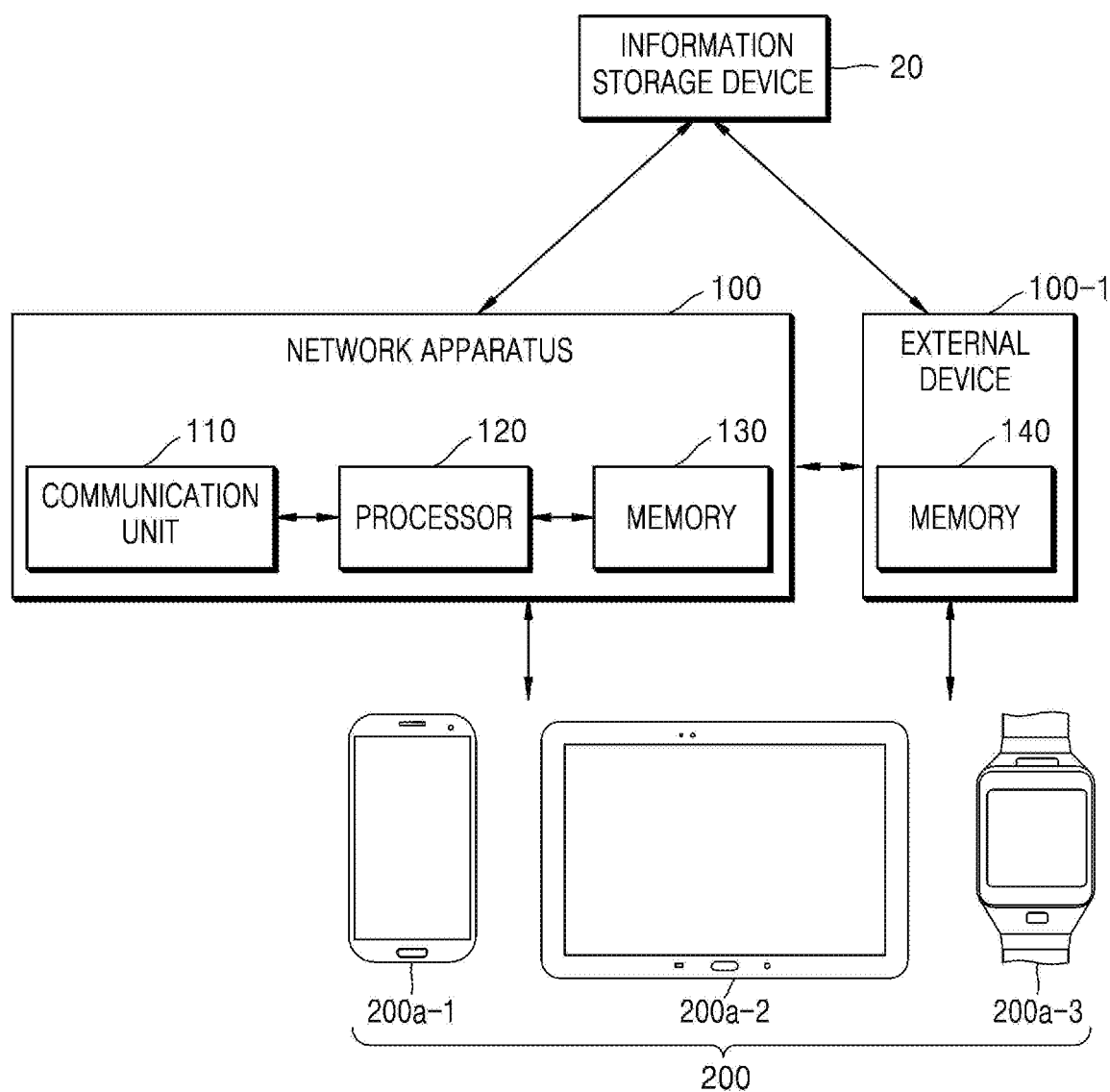
FIG. 3 is a view for describing an operation of a system using a network apparatus according to an embodiment.

FIG. 3 is a view for describing an operation of system using a network apparatus according to an embodiment.

The network apparatus 100 shown in FIG. 3 may connect the user device 200 to the service provider server 20 to allow data transmission/reception between the user device 200 and the service provider server 20.

Also, an external device 100-1 may be a device located within a predetermined distance range from the service provider server 20 to transmit/receive data to/from the user device 200.

The external device 100-1 shown in FIG. 3 may itself transmit/receive data to/from the service provider server 20 and the user device 200. The external device 100-1 may transmit/receive a control signal to/from the user device 200 through short-range communications including wireless communications, Bluetooth, NFC, etc. Also, the external device 100-1 may be connected to a network through the network apparatus 100 to transmit/receive data to/from the service provider server 20 and the user device 200.

A memory 140 of the external device 100-1 may receive authentication information issued by the service provider server 20 from the user device 200, and store the authentication information. Also, the memory 140 of the external device 100-1 may back up data stored in the authentication information storage device 131 among data stored in the memory 130 of the network apparatus 100, and store the back-up data.

More specifically, the memory 140 of the external device 100-1 may store authentication information which a user has acquired through the service provider server 20. Also, the memory 140 of the external device 100-1 may store a first account corresponding to a first account, and connect a password corresponding to the first account, the first account, and authentication information acquired by logging in the service provider server 20 using the first account to the first account to store the information associated with the first account.

Also, the memory 140 of the external device 100-1 may store priority information of accounts. For example, the priority information of accounts may be information that a personalized account corresponding to a user account has higher priority than a default account of the network apparatus 100. The priority information of accounts may cause the user device 200 to preferentially connect, when the user device 200 tries to connect to the network apparatus 100, to an account corresponding to the user account of the user device 200.

Figure 4:
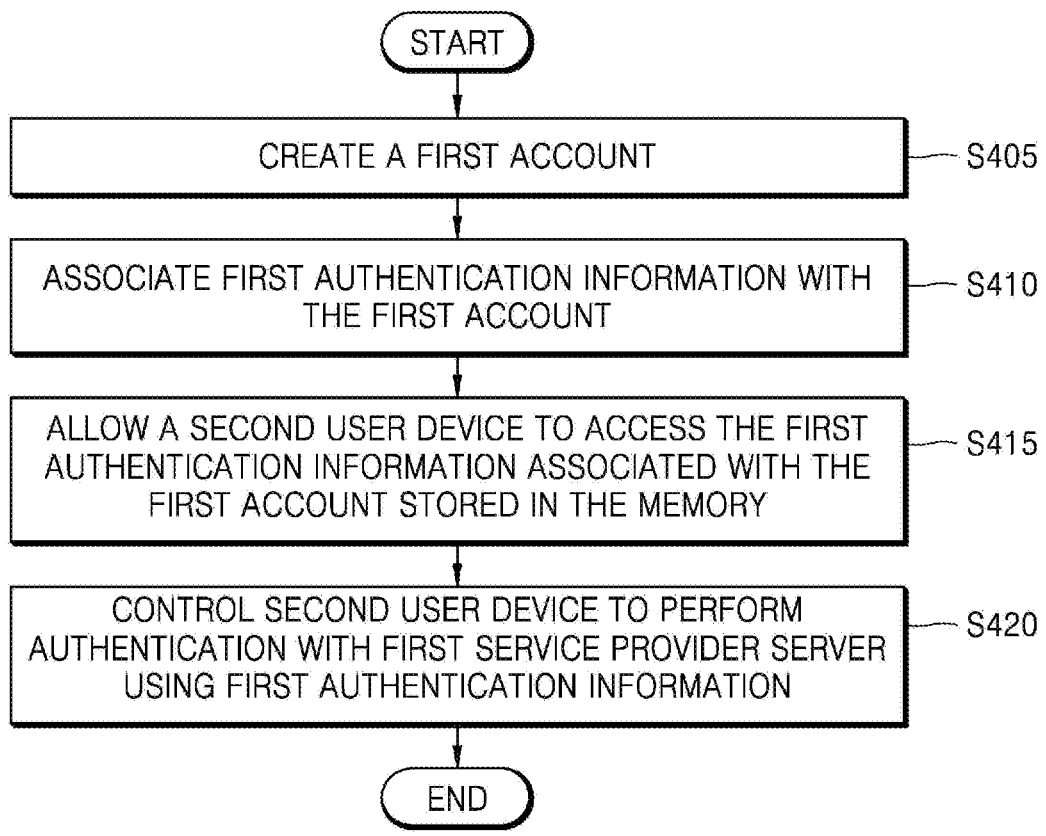
FIG. 4 is a flowchart showing an operation of a network apparatus according to an embodiment in a system using the network apparatus.

FIG. 4 is a flowchart showing an operation of a network apparatus according to an embodiment in a system using the network apparatus.

In operation S405, the network apparatus 100 may create a first account. According to an embodiment, the network apparatus 100 may create the first account based on a request from the first user device to create an account.

The first user device may be a user device that can use a service by logging in a first service provider server. According to an embodiment, the first user device may be a device that attempts to connect to the network apparatus 100 for the first time or a device that has previously connected to the network apparatus 100 through a default account.

In operation S410, the network apparatus 100 may associate first authentication information with the first account and store the first authentication information associated with the first account in a memory. According to an embodiment, the network apparatus 100 may associate the first authentication information with the first account when the network apparatus 100 receives the first authentication information for authentication with the first service provider server from the first user device.

The first authentication information may be an authentication token for authenticating that a user attempting to log in the first service provider server is a user using a first account.

Also, the network apparatus 100 may associate the first authentication information with the first account and the first service provider server 20a, and store the first authentication information associated with the first account and the first service provider server 20a in the memory.

In operation S415, the network apparatus 100 may allow the second user device to access information associated with the first account and stored in the memory. According to an embodiment, the network apparatus 100 may allow the second user device to access the first authentication information associated with the first account and stored in the memory when a second user device connects to the network apparatus 100 through the first account.

In operation S420, the network apparatus 100 may facilitate the second user device to perform authentication with the first service provider server using the first authentication information. According to an embodiment, the second user device may perform the authentication with the first service provider server using the first authentication information accessed from the memory.

Operation in which the network apparatus 100 controls the second user device to perform authentication in the first service provider server using the first authentication information may be operation in which the network apparatus 100 transmits the first authentication information to the second user device according to a request from the second user device.

Figure 5:
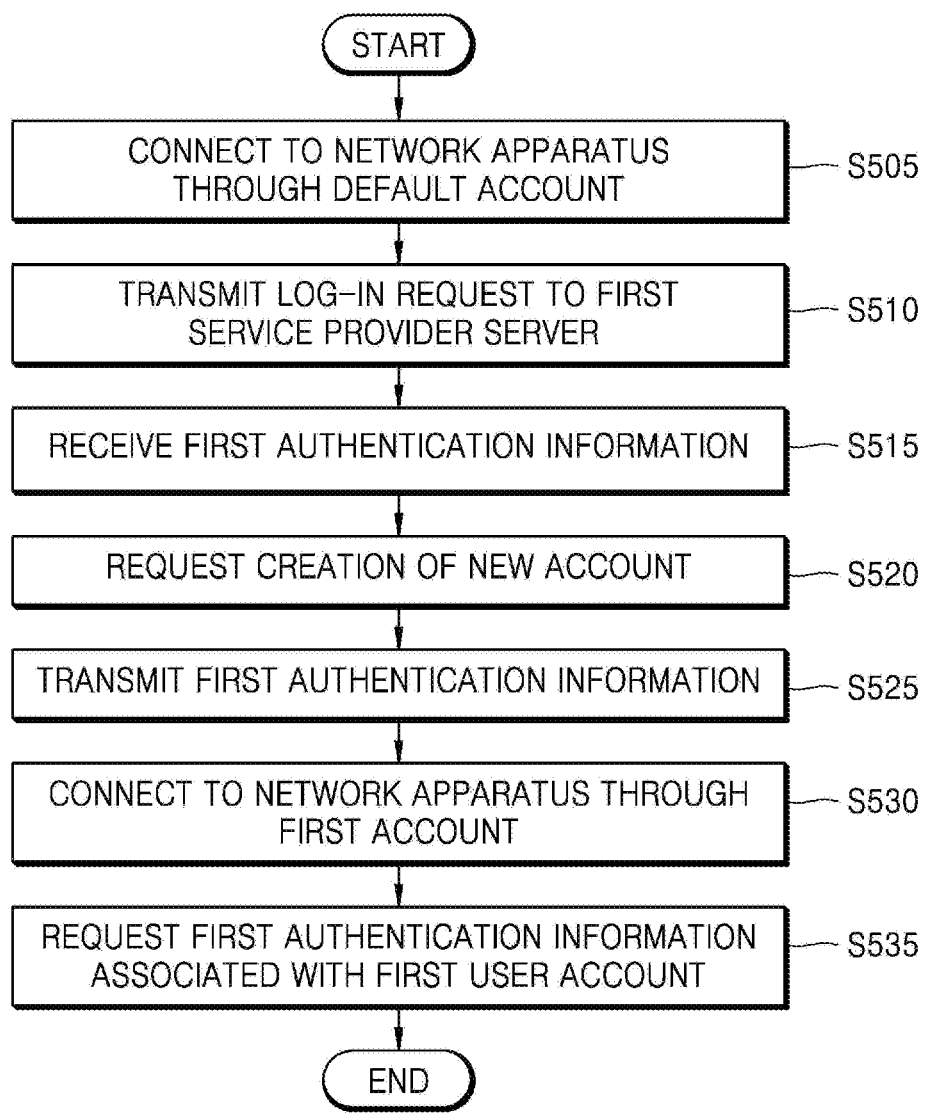
FIG. 5 is a flowchart showing an operation of a user device in a system using a network apparatus according to an embodiment.

FIG. 5 is a flowchart showing an operation of a user device in system using a network apparatus according to an embodiment.

In operation S505, the user device 200 may connect to the network apparatus 100 through a default account.

In operation S510, the user device 200 may transmit a log-in request to the first service provider server.

The user device 200 may be a device that attempts to connect to the network apparatus 100 for the first time or a device that has previously connected to the network apparatus 100 through a default account.

In operation S515, the user device 200 may receive first authentication information created by the first service provider server.

The first authentication information may be an authentication token for authenticating that a user attempting to log in the first service provider server 20a is a user authorized to log in the first service provider server.

In operation S520, the user device 200 may request the network apparatus 100 to create a new account.

In operation S525, the user device 200 may transmit the received first authentication information to the network apparatus 100.

The user device 200 may perform operation S525 of transmitting the received first authentication information to the network apparatus 100 before operation S520 of requesting the network apparatus 100 to create the new account, or may perform operation S520 and operation S525 at the same time. When the network apparatus 100 receives the first authentication information, the network apparatus 100 may associate the first authentication information with a newly created first account, and store the first authentication information associated with the first account.

In operation S530, the user device 200 may connect to the network apparatus 100 using the first account.

In operation S535, the user device 200 may perform authentication with the first service provider server using the first account.

The user device 200 may transmit a log-in request to the first service provider server using the first account for logging in the first service provider server, through the network apparatus 100.

For example, the user device 200 may request the network apparatus 100 to transmit the first authentication information associated with the first account. The user device 200 may be controlled to access information associated with the first account, and to access information for the first service provider server associated with the first account. When there is first authentication information for the first service provider server associated with the first account, the user device 200 may request the network apparatus 100 to transmit the first authentication information.

The user device 200 may transmit a log-in request to the first service provider server using the first authentication information.

FIGS. 6A to 6E are views for describing a process in which a user device connects to a network apparatus to create a new account.

Figure 6A:
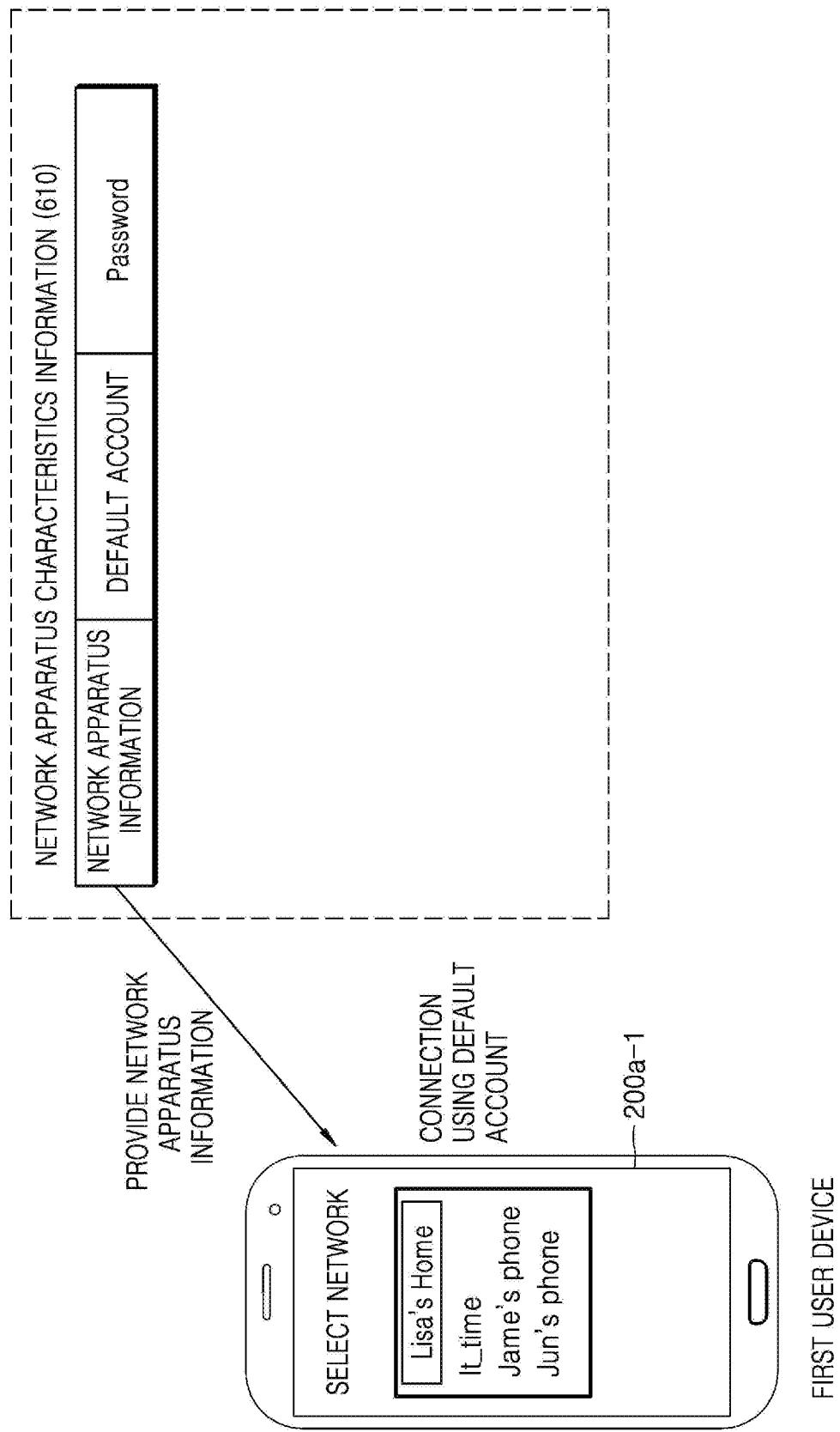

Referring to FIG. 6A, a first user device 200a-1 may connect to the network apparatus 100a using a default account. The first user device 200a-1 may be a device that tries to connect to the network apparatus 100 for the first time or a device that has previously connected to the network apparatus 100 through a default account.

The network apparatus 100 may store network apparatus characteristics information 610. The network apparatus characteristics information 610 may include network apparatus information, a default account of the network apparatus 100, or a password corresponding to the default account. The network apparatus information may include unique information of the network apparatus 100 including a Mac address of the network apparatus 100, an IP address of the network apparatus 100, etc.

The first user device 200a-1 may input the default account of the network apparatus 100 and the password corresponding to the default account, thereby connecting to the network apparatus 100.

Also, the first user device 200a-1 may receive the network apparatus information from the network apparatus 100.

Referring to FIG. 6B, the first user device 200a-1 may log in a first service provider server 20a by inputting a first account and a password corresponding to the first account or by using a bio-information authentication method, etc.

The first user device 200a-1 logged in the first service provider server 20 may receive first authentication information created by the first service provider server 20*a*. The first authentication information may be an authentication token for authenticating that the user device 200*a*-1 trying to log in the first service provider server 20*a* is a device of a user who uses the first account. For example, the first authentication information may be, for example, an authentication token Token a-1.

Figure 6C:
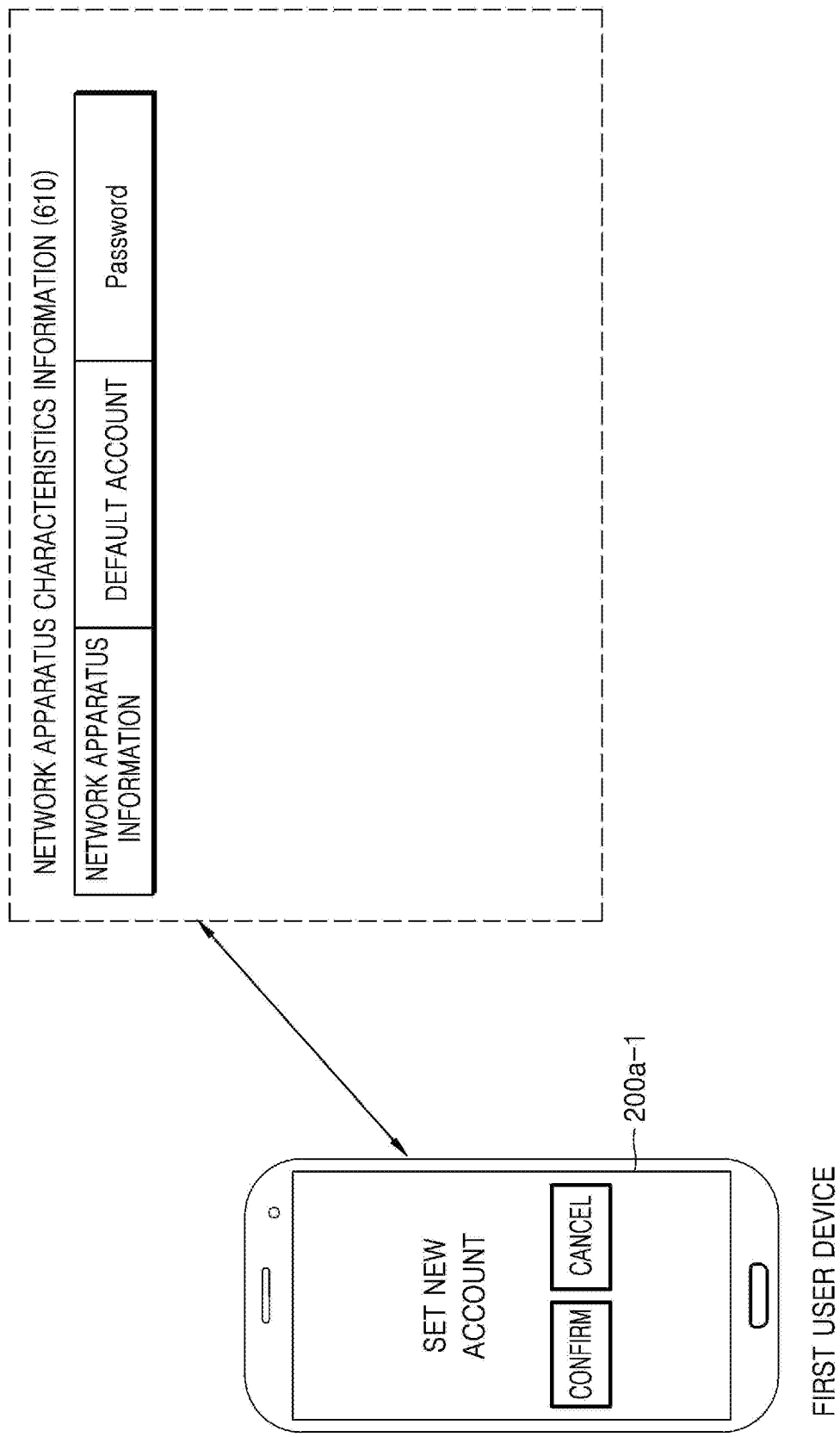

Referring to FIG. 6C, the network apparatus 100 may determine whether there is an account corresponding to the first account, and create a new account if there is no account corresponding to the first account.

The network apparatus 100 may request the first user device 200*a*-1 to display a user interface for setting a new account. Accordingly, the first user device 200*a*-1 may display a user interface for inquiring a user about whether to set a personalized account or a new account. For example, the user interface may include messages, such as "Set New Account", "Would You Set New Account?", "Would You Set Account for Your Device?", "Would You Make Space for Sharing Authentication Information of Your Device?", etc.

Figure 6D:
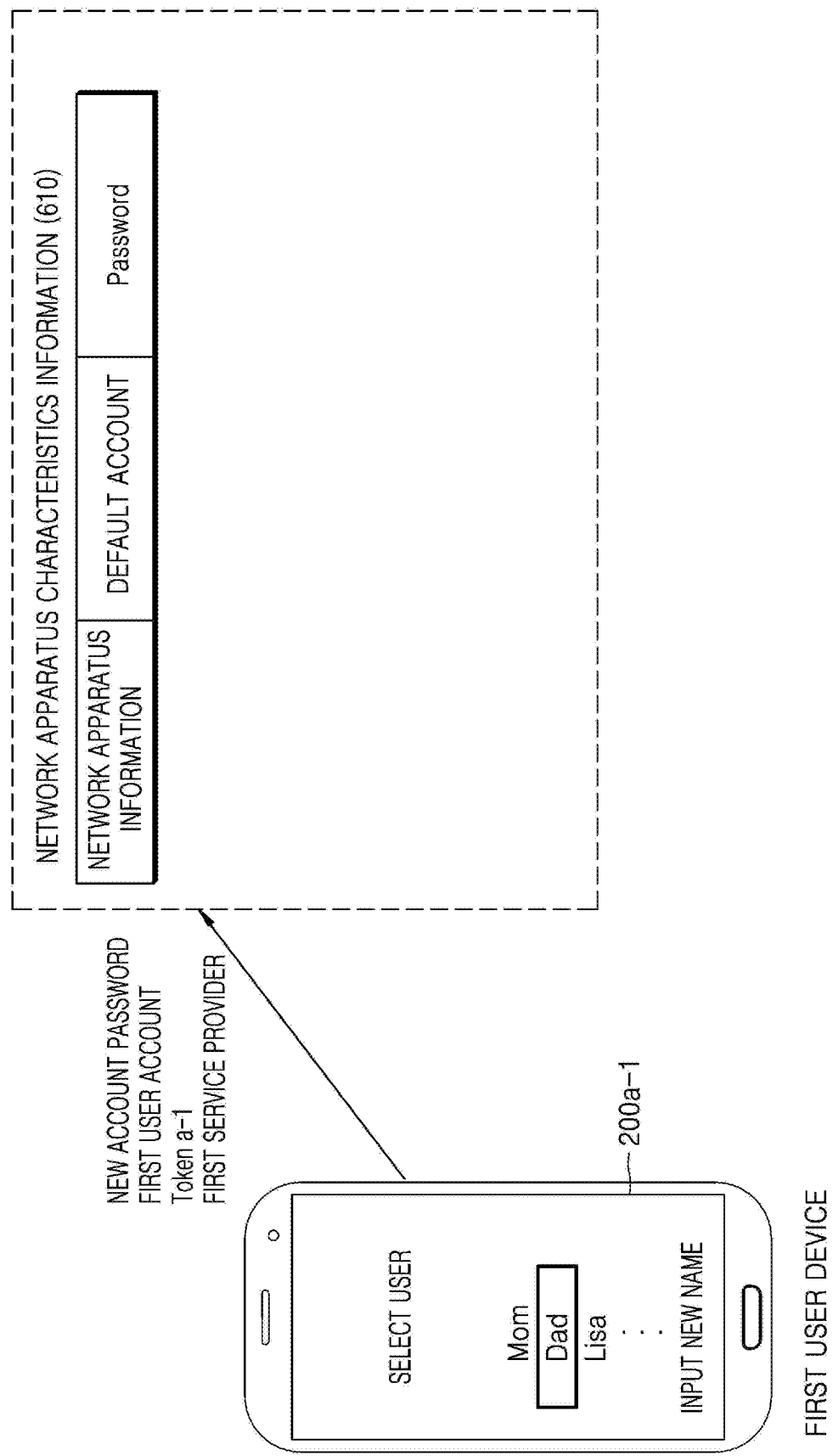

Referring to FIG. 6D, the network apparatus 100 may facilitate the first user device 200*a*-1 to display a user interface for receiving a name of a new account.

For example, the network apparatus 100 may be a home network apparatus, and the first user may be a family member. The network apparatus 100 may facilitate the first user device 200*a*-1 to receive a name of a new account directly from a user or to display a user interface for allowing a user to select a name of a new account from among a family member, a user name, etc.

The network apparatus 100 may receive a new account, a password corresponding to the new account, the first account, the first authentication information Token a-1, and information about the first service provider server 20*a*, from the first user device 200*a*-1.

Figure 6E:
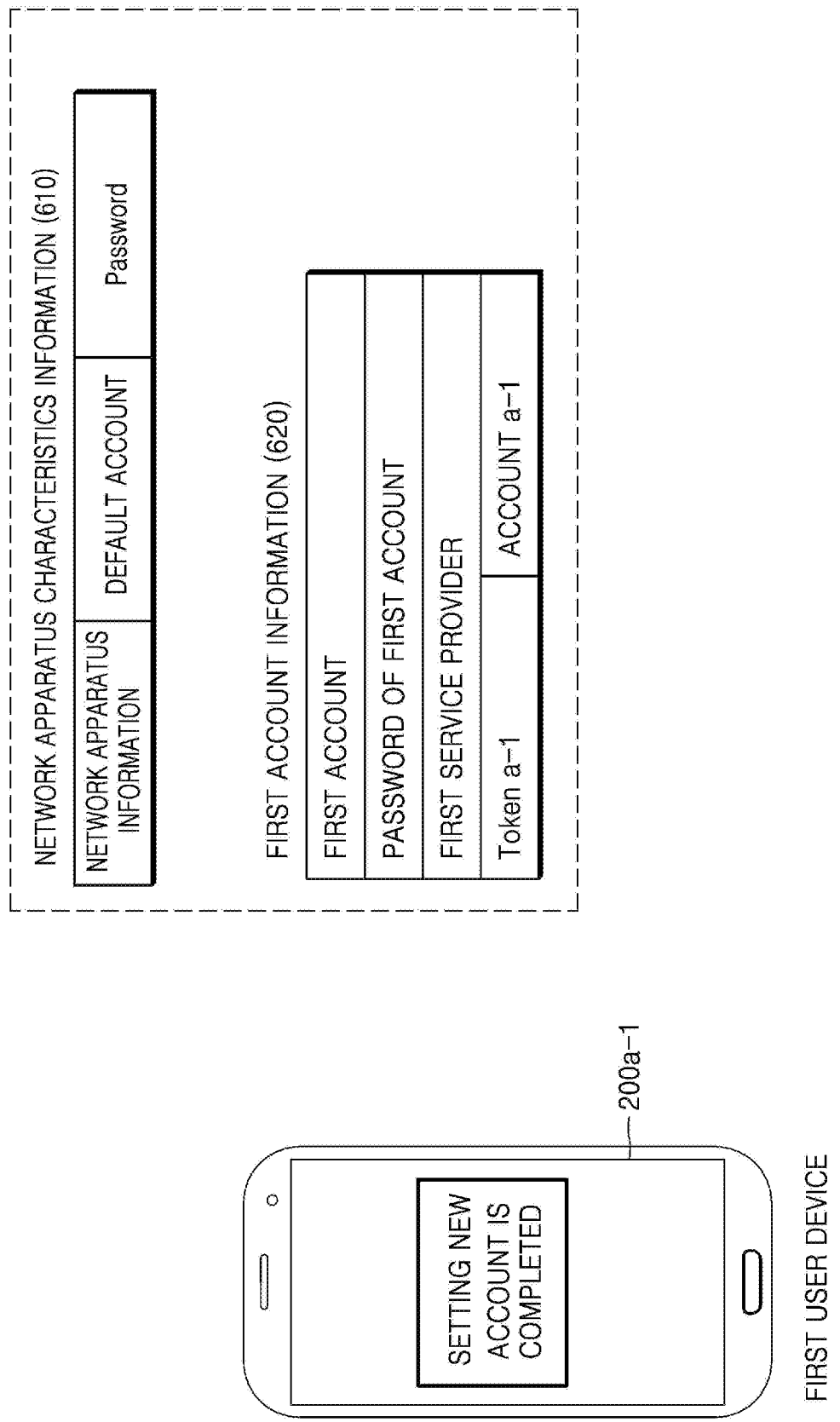

Referring to FIG. 6E, the network apparatus 100 may connect a first account being the new account received from the first user device 200*a*-1 to a password corresponding to the first account, and store the first account and the password. Also, the network apparatus 100 may connect the information about the first service provider server 20*a*, first account information (account a-1) for authentication in the first service provider server 20*a*, and the first authentication information Token a-1 to the first account, and store the information as first account information 620.

The network apparatus 100 may create the first account which is a personalized account, and manage the first account to thereby simplify an authentication method with respect to all user devices connecting to the network apparatus 100 using the first account to log in the first service provider server 20*a*.

FIGS. 7A to 7D are views for describing a process in which a user device connects to a network apparatus to perform user authentication.

Figure 7A:
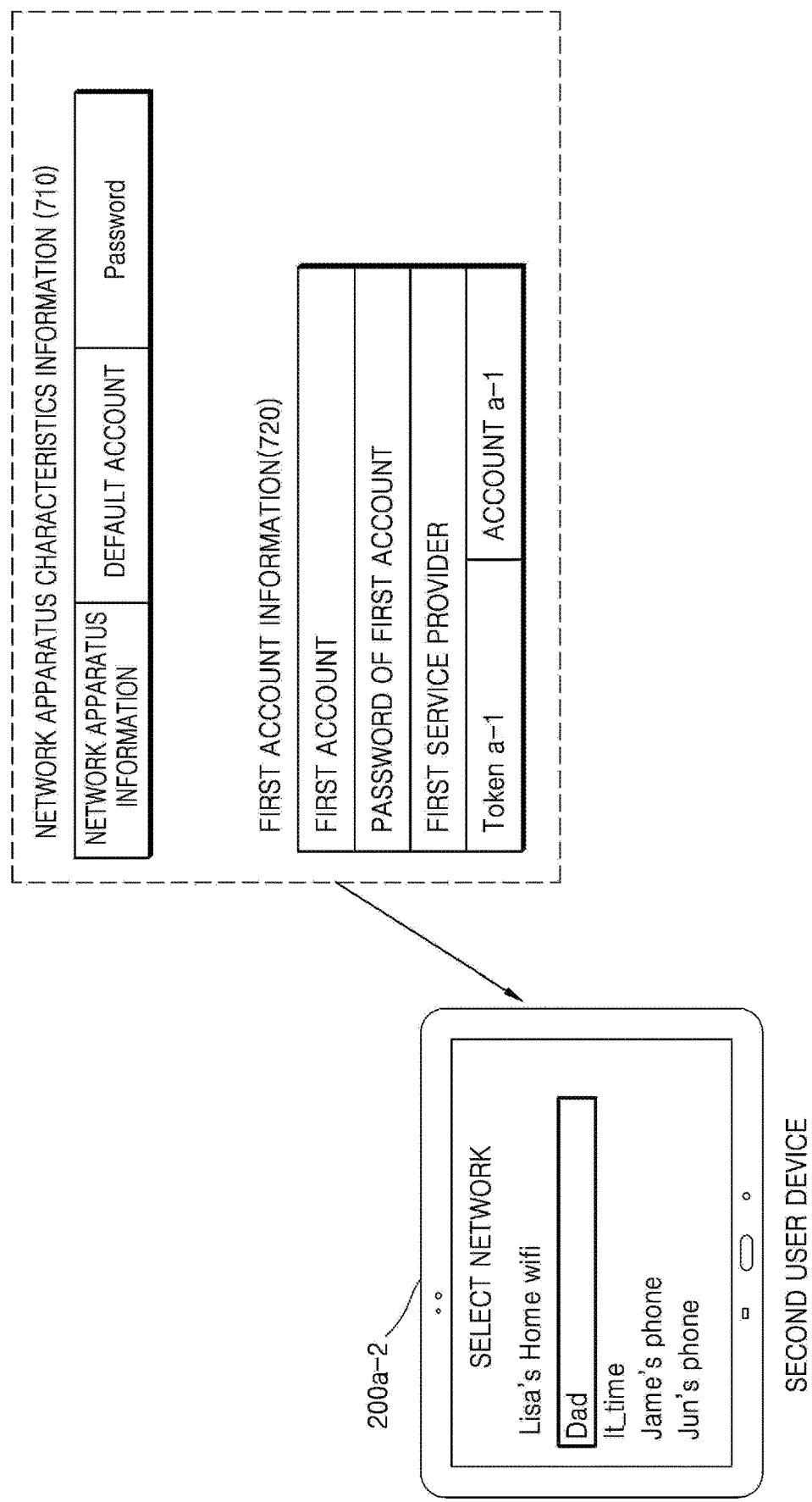
FIGS. 7A to 7D are views for describing a process in which a user device connects to a network apparatus to perform user authentication.

Referring to FIG. 7A, a second user device 200*a*-2 may be one of a plurality of devices of a first user who uses a first account (for example, account a-1). Also, the second user device 200*a*-2 may be one of a plurality of devices included in a first user device group (see 200*a* of FIG. 1) that is used by the first user. Also, the second user device 200*a*-2 may be the first user device 200*a*-1 described above with reference to FIG. 6, or a device that is different from the first user device 200*a*-1.

The network apparatus 100 may transmit network apparatus characteristics information 710, a default account included in the network apparatus characteristics information 710, or information about a first account included in first account information 720 to the second user device 200*a*-2.

The second user device 200*a*-1 may connect to the network apparatus 100 through the first account.

Figure 7B:
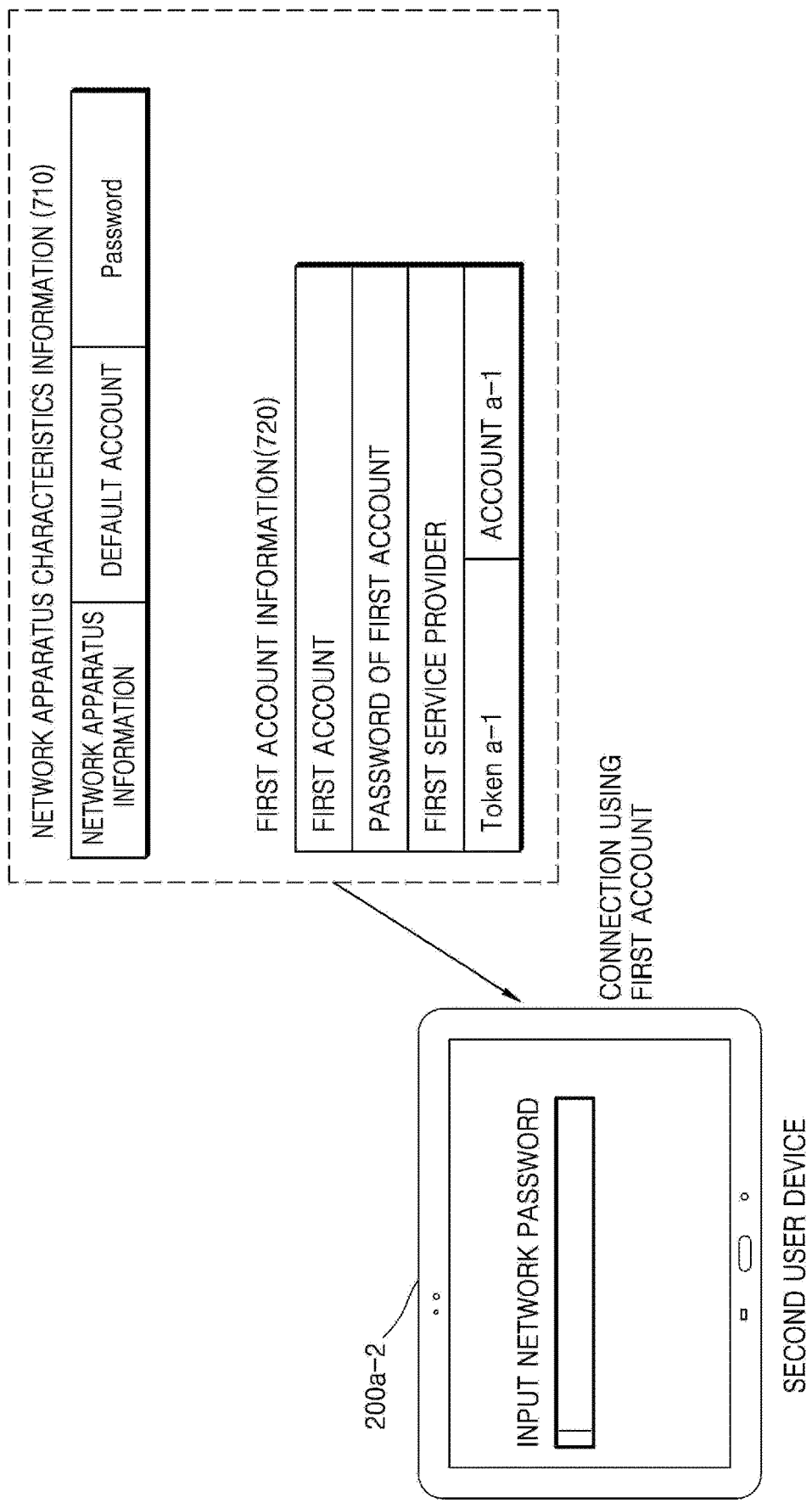

Referring to FIG. 7B, the second user device 200*a*-2 may input a password corresponding to the first account to connect to the network apparatus 100. When the second user device 200*a*-2 has previously connected to the network apparatus 100 using the first account, the second user device 200*a*-2 may connect to the network apparatus 100 automatically through the first account, without having to input a password.

Figure 7C:
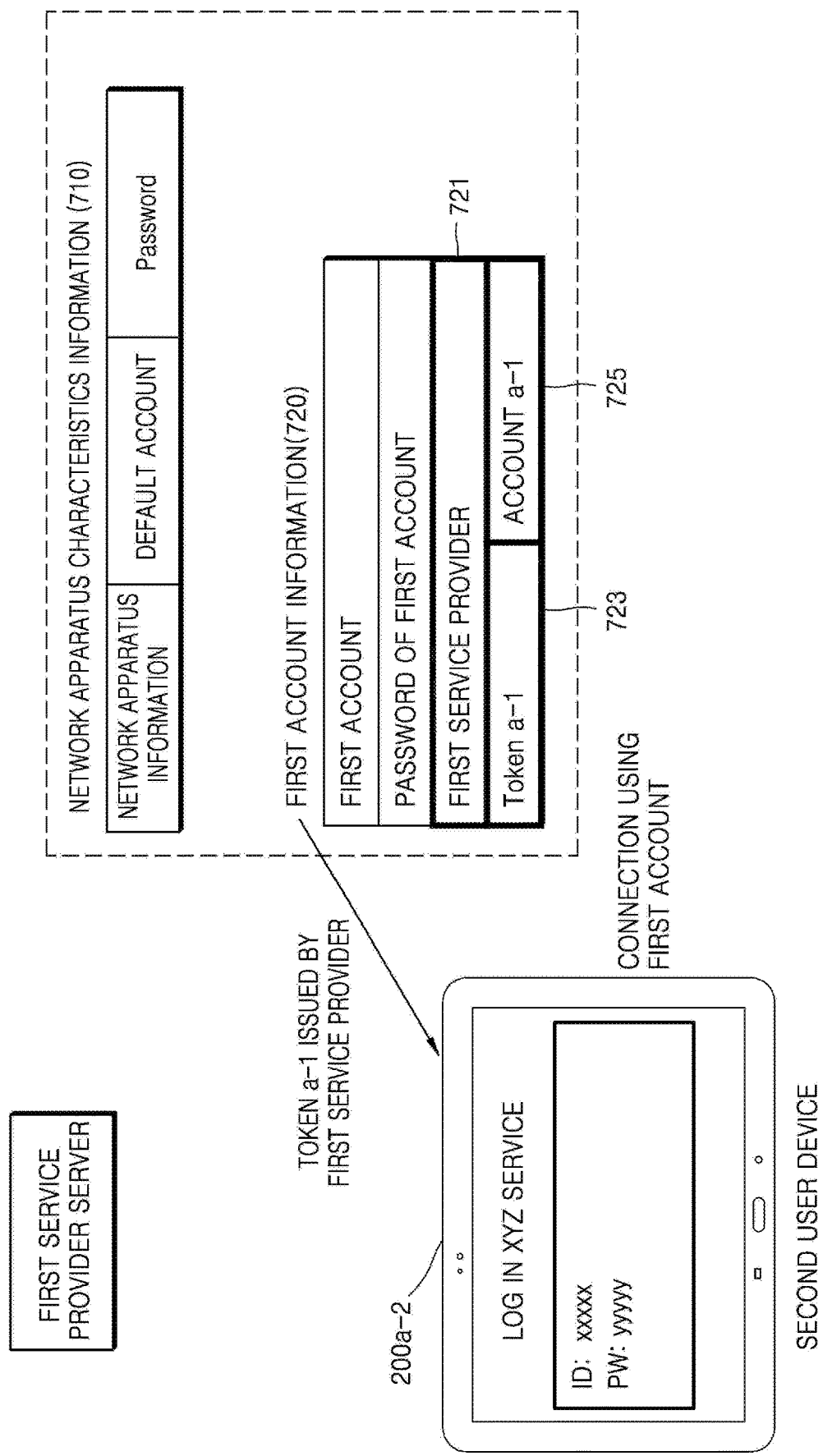

Referring to FIG. 7C, the second user device 200*a*-2 may perform authentication to log in the first service provider server 20*a*.

Before the second user device 200*a*-2 transmits a log-in request to the first service provider server 20*a*, the second user device 200*a*-2 may search a first service provider 721 in the first account information 720.

The second user device 200*a*-2 may determine whether the first account information 720 includes authentication information associated with the first service provider 721 and stored. When the second user device 200*a*-2 determines that the first account information 720 includes authentication information associated with the first service provider 721 and stored, the second user device 200*a*-2 may request the network apparatus 100 to transmit Token a-1 723 which is first authentication information. The network apparatus 100 may transmit the first authentication information (Token a-1) 723 stored together with information about the first service provider 721 to the second user device 200*a*-2, in response to the request from the second user device 200*a*-2.

When the first service provider server 20*a* receives Token a-1 723 which is the first authentication information and completes authentication of the first user, the first service provider server 20*a* may allow the first user device 200*a*-1 to log in.

Even when the second user device 200*a*-2 is a device that logs in the first service provider server 20*a* for the first time, the second user device 200*a*-2 may easily log in the first service provider server 20*a* using Token a-1 723 which is the first authentication information stored in the network apparatus 100, without having to input the first account and the password corresponding to the first account or without authentication through bio-information.

Figure 7D:
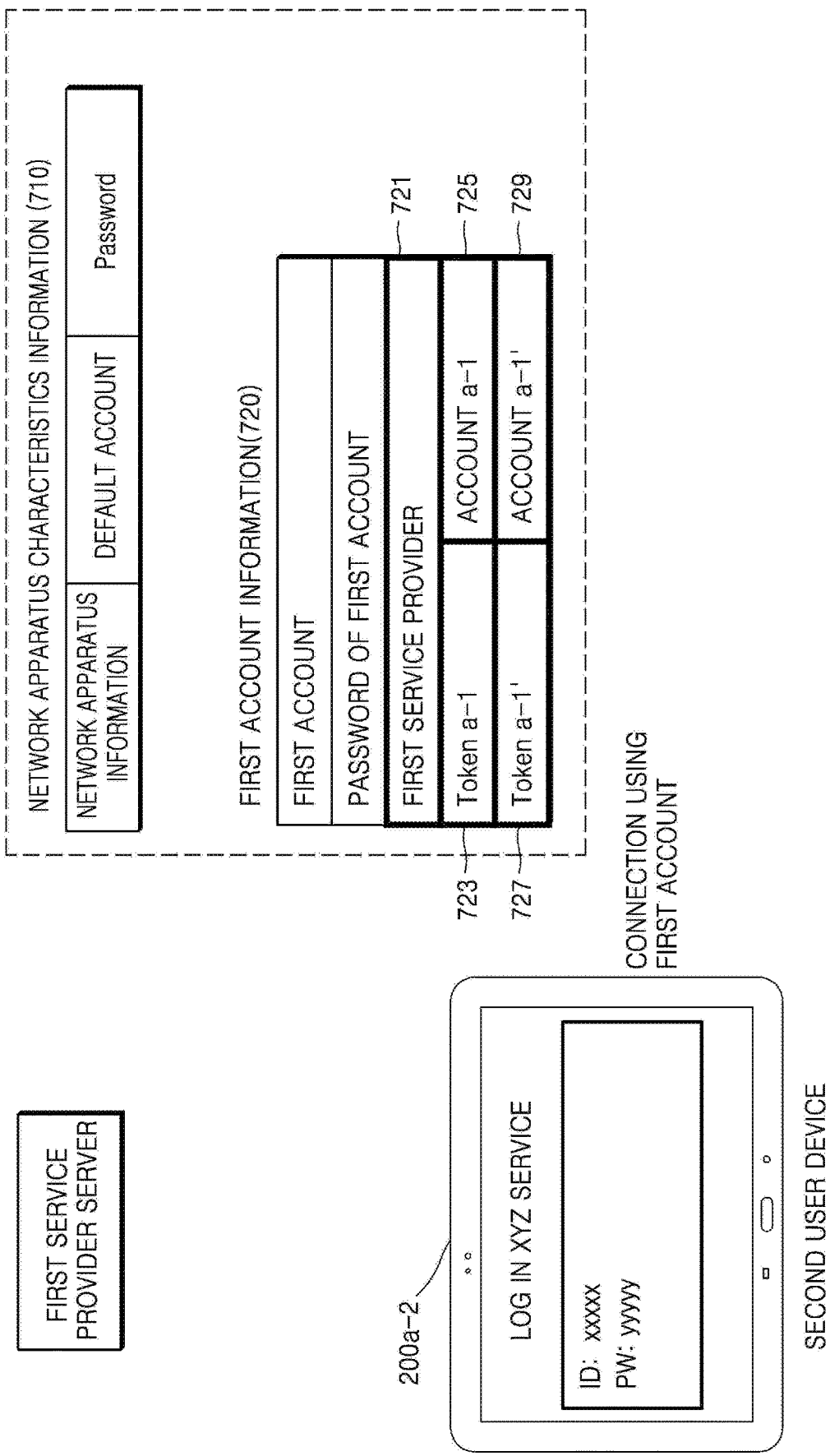

Referring to FIG. 7D, a case in which there are a plurality of user accounts for using a service of the first service provider 721 associated with the first account is shown.

Before the second user device 200*a*-2 transmits a log-in request to the first service provider server 20*a*, the second user device 200*a*-2 may search the first service provider 721 in the first account information 720.

The user account associated with the first service provider 721 may be a plurality of accounts including the first account (account a-1) and a second user account (account a-1').

According to an embodiment, the network apparatus 100 may connect Token a-1 723 corresponding to the first account a-1 to the account a-1 725 and store Token a-1 723 and the account a-1 725, below the information about the first service provider 721, and the network apparatus 100 may connect Token a-1' 727 corresponding to the second user account a-1' to the account a-1' 729 and store Token a-1' 727 and the account a-1' 729.

In this case, when the second user device 200*a*-2 searches authentication information associated with the first service provider 721 and stored in the first account information 720, the second user device 200*a*-2 may find two pieces of authentication information associated with the first service provider 721. The network apparatus 100 may facilitate the second user device 200*a*-2 to select an account with which it will log in from among the first account a-1 and the second user account a-1'. Also, the network apparatus 100 may control a user to perform user authentication using an account selected as a default account by the user from the first account a-1 and the second user account a-1', or to perform user authentication using a previously used account.

The second user device 200*a*-2 may request the network apparatus 100 to transmit authentication information for one among the plurality of user accounts.

For example, the second user device 200*a*-2 may select an account with which it will log in from among the first account a-1 and the second user account a-2, and then request the network apparatus 100 to transmit authentication information corresponding to the account selected from among the first account a-1 and the second user account a-1'.

Also, the network apparatus 100 may transmit authentication information corresponding to all of the plurality of user accounts to the second user device 200*a*-2, in response to an authentication information transmission request from the second user device 200*a*-2.

Figure 8:
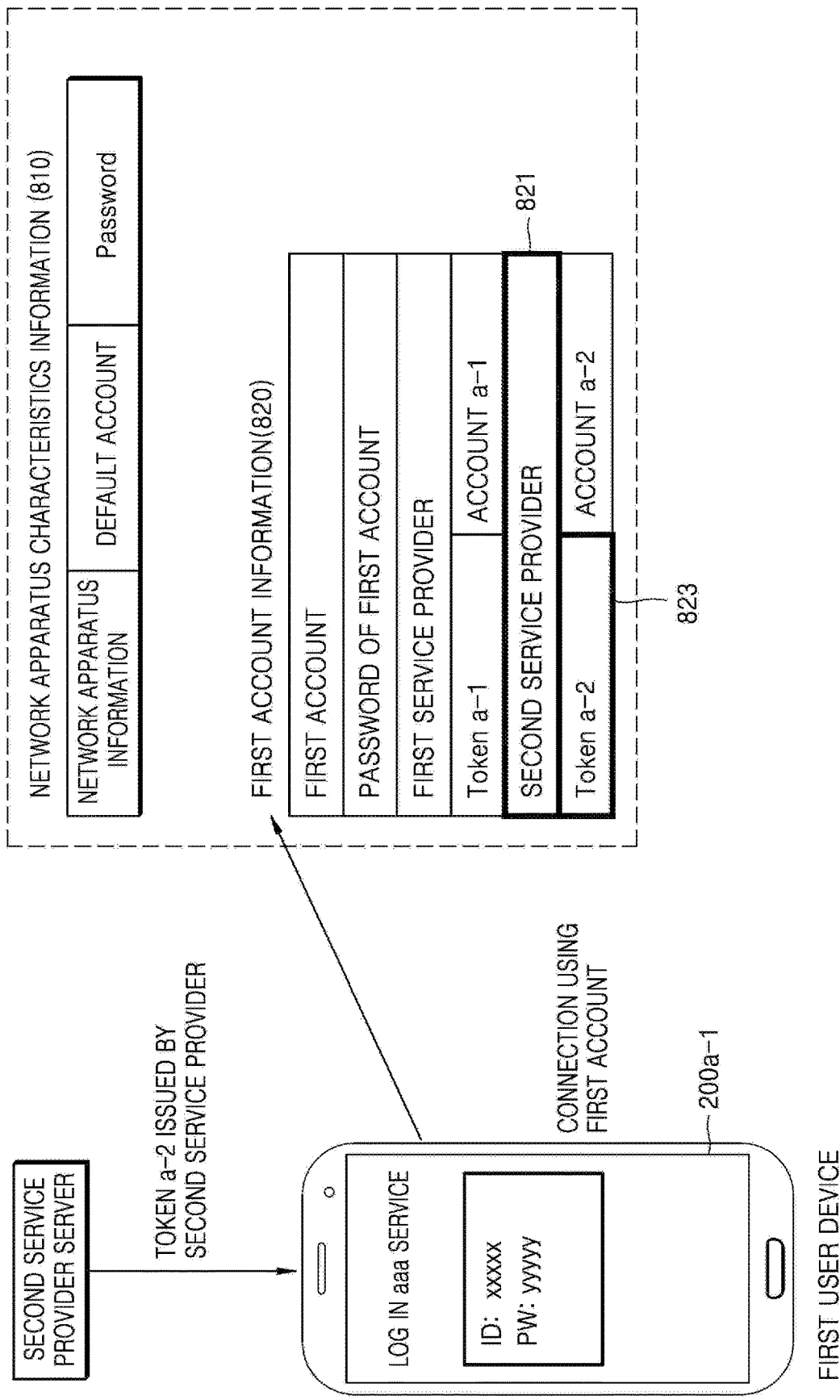
FIG. 8 is a view for describing a process in which a user device is issued authentication information from a service provider.

FIG. 8 is a view for describing a process in which a user device is issued authentication information from a service provider.

The first user device 200*a*-1 may connect to the network apparatus 100 through the first account. The first user device 200*a*-1 connected to the network apparatus 100 may transmit a log-in request for logging in a second service provider server 20*b* to the network apparatus 100.

Then, the network apparatus 100 may search a second service provider 821 in first account information 820. When the network apparatus 100 fails to find information about the second servicer provider 821 in the first account information 820, the network apparatus 100 may request the first user device 200*a*-1 or the second service provider server 20*b* to issue Token a-2 823 which is second authentication information created by the second service provider server 20*b*.

FIGS. 9A to 9E are views for describing a process in which a user device connects to a network apparatus to create a new account.

Figure 9A:
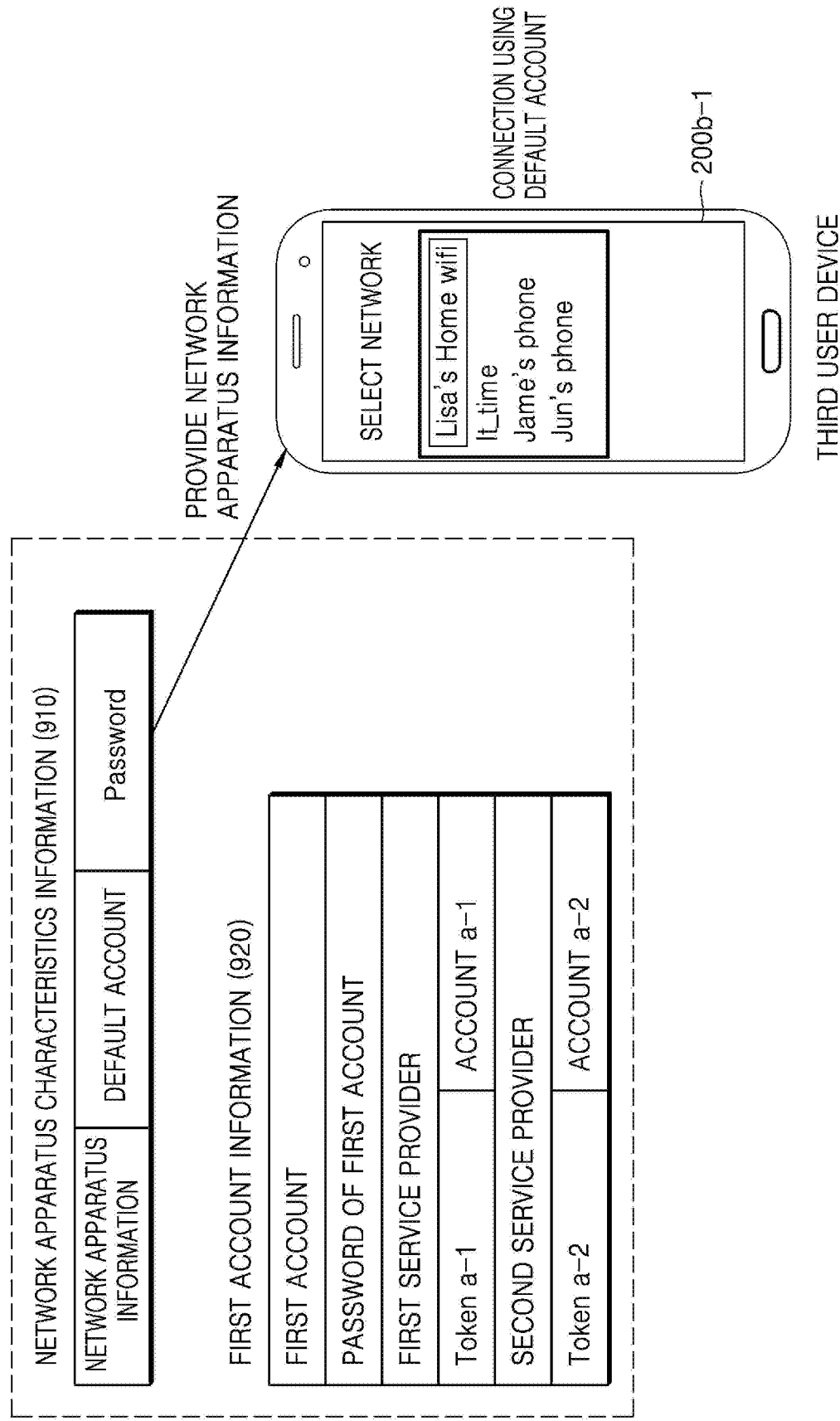

Referring to FIG. 9A, a third user device 200*b*-1 may connect to the network apparatus 100 using a default account. The third user device 200*b*-1 may be a device that tries to connect to the network apparatus 100 for the first time or a device that has previously connected to the network apparatus 100 through a default account. Also, the third user device 200*b*-1 may be one of user devices belonging to the second user device group 200*b*.

The network apparatus 100 may store network apparatus characteristics information 910. The network apparatus characteristics information 910 may include network apparatus information, a default account of the network apparatus 100, or a password corresponding to the default account. The network apparatus information may be unique information of the network apparatus 100 including a Mac address of the network apparatus 100, an IP address of the network apparatus 100, etc. The network apparatus 100 may store first account information 920. The first account information 920 may be information resulting from connecting the first account corresponding to the first user device group 200*a*, the password corresponding to the first account, a user account for authentication in a service provider server, authentication information corresponding to the user account, or information about the service provider to each other.

The third user device 200*b*-1 may connect to the network apparatus 100 by inputting the default account of the network apparatus 100 and the password corresponding to the default account of the network apparatus 100.

Also, the third user device 200*b*-1 may receive the network apparatus information from the network apparatus 100.

Referring to FIG. 9B, the third user device 200*b*-1 may log in the first service provider server 20*a* by inputting a third user account and a password corresponding to the third user account or by using a bio-information recognition method, etc.

The third user device 200*b*-1 logged in the first service provider server 20*a* may receive third authentication information created by the first service provider server 20*a*. The third authentication information may be an authentication token for authenticating that the third user device 200*b*-1 trying to log in the first service provider server 20*a* is a device using the third user account. The third authentication information may be, for example, an authentication token Token b-1.

Figure 9C:
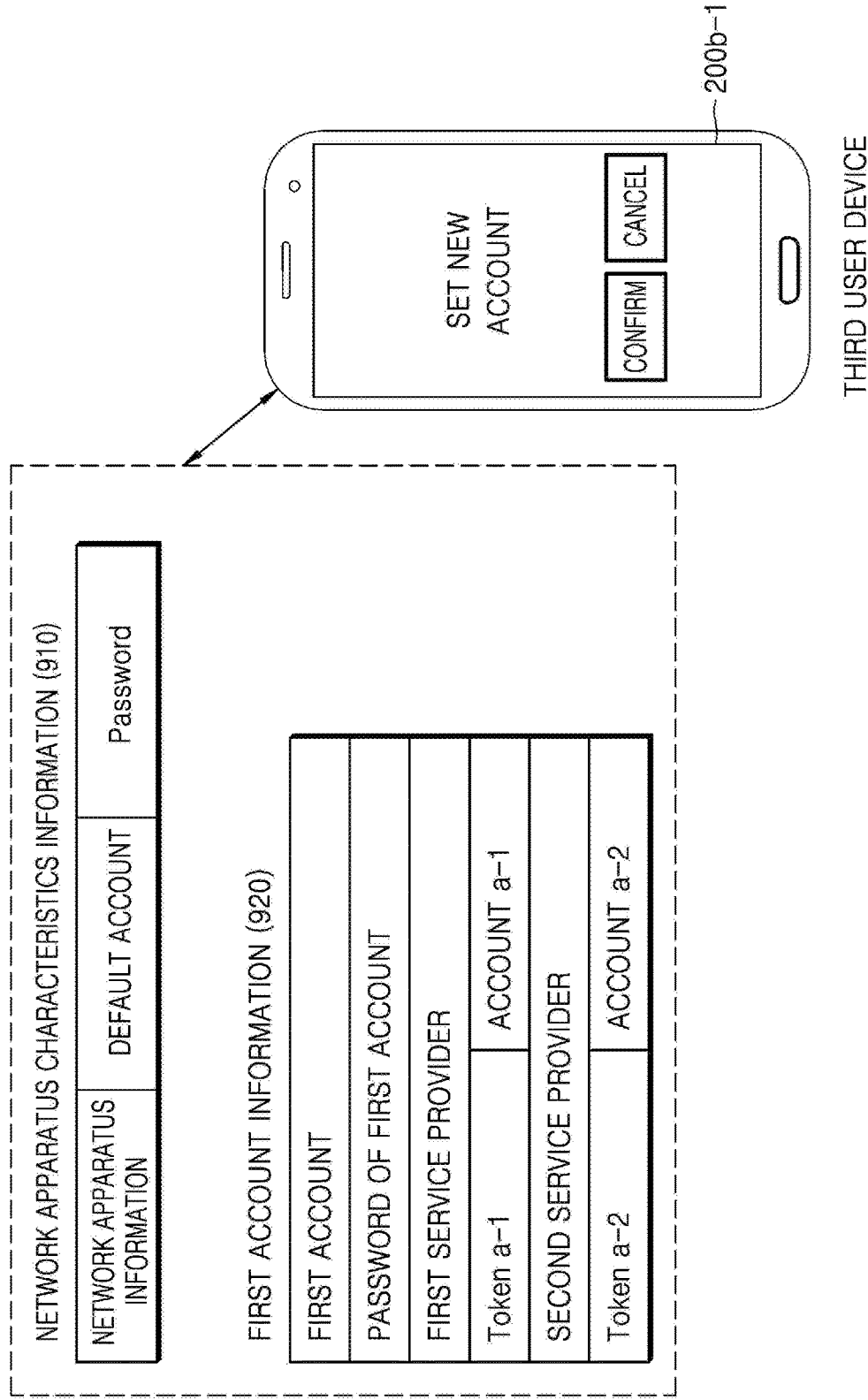

Referring to FIG. 9C, the network apparatus 100 may create a new account when there is no account storing information corresponding to the third user account.

The network apparatus 100 may request the third user device 200*b*-1 to display a user interface for setting a new account. Accordingly, the third user device 200*b*-1 may display a user interface for inquiring a user about whether to set a personalized account or a new account.

Figure 9D:
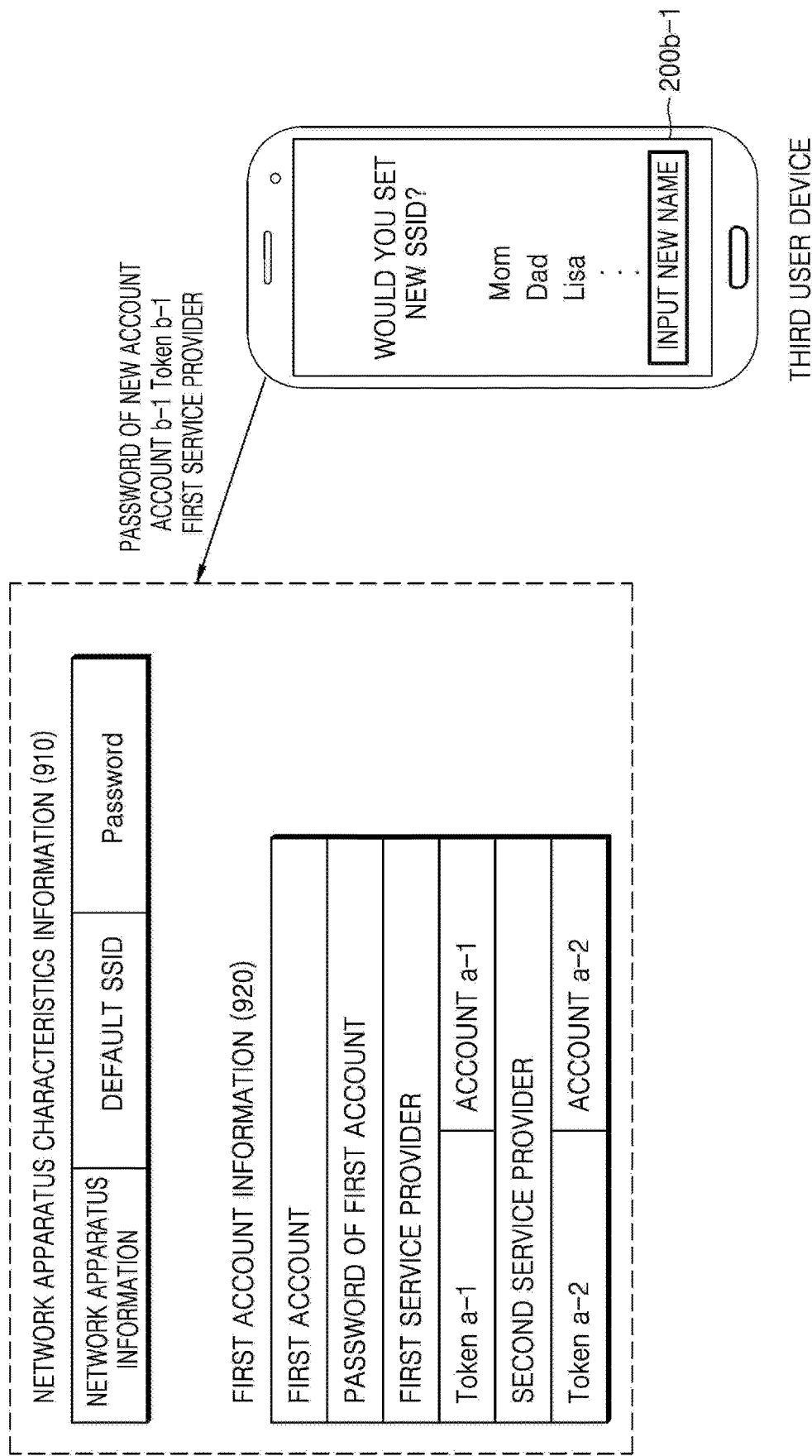

Referring to FIG. 9D, the network apparatus 100 may facilitate the third user device 200*b*-1 to display a user interface for receiving a name of a new account.

For example, the network apparatus 100 may be a home network apparatus, and the first user may be a family member. The network apparatus 100 may facilitate the third user device 200*b*-1 to receive a name of a new account directly from a user or to display a user interface for allowing a user to select a name of a new account from among a family member, a user name, etc.

The network apparatus 100 may receive a new account, a password corresponding to the new account, the third user account (account b-1) for authentication in the first service provider server 20*a*, the third authentication information (Token b-1), or the first service provider information, from the third user device 200*b*-1.

Referring to FIG. 9E, the network apparatus 100 may connect a second account being the new account received from the third user device 200*b*-1, a password corresponding to the second account, the third user account, the third authentication information Token b-1, or the first service provider information to each other, and store the information as second account information 930.

Also, the network apparatus 100 may create the second account which is a personalized account of a user using the third user device 200*b*-1, and manage the second account to thereby simplify an authentication method with respect to all user devices trying to connect to the network apparatus 100 with the second account to log in the first service provider server 20*a*.

When a user device belonging to the second user device group 200*b* connects to the network apparatus 100 through the second account, the network apparatus 100 may facilitate the user device to access the second account information 930 which is data connected to the second account among data stored in the authentication information storage device (see 131 of FIG. 2) of the memory (see 130 of FIG. 2).

Likewise, when a user device belonging to the first user device group 200a connects to the network apparatus 100 through the first account, the network apparatus 100 may facilitate the user device to access the first account information 920 which is data associated with the first account among data stored in the authentication information storage device of the memory.

Figure 10:
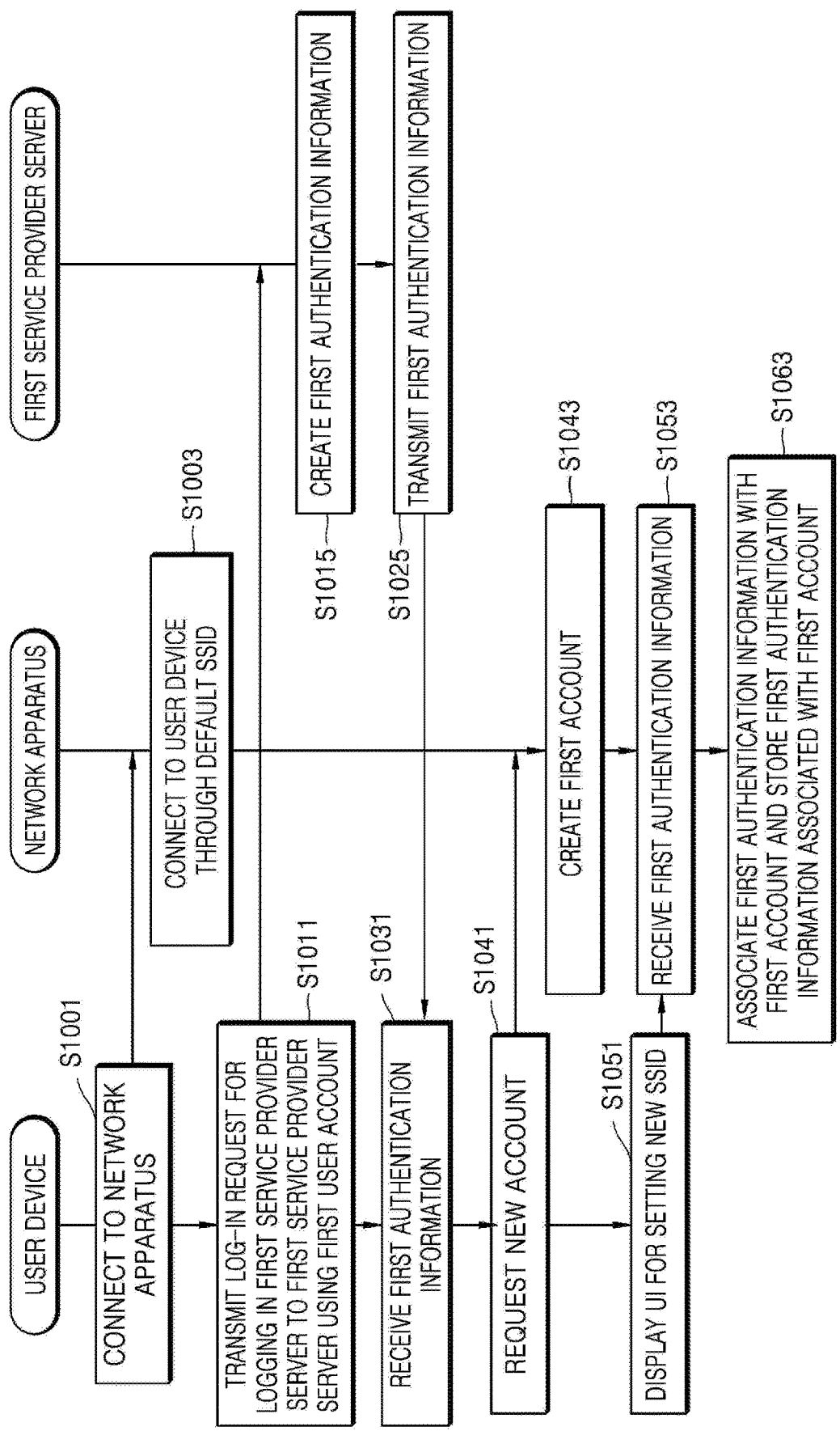
FIG. 10 is a flowchart showing operations between a user device, a network apparatus, and a first service provider server, according to an embodiment.

FIG. 10 is a flowchart showing operations between a user device, a network apparatus, and a first service provider server, according to an embodiment.

The user device 200 according to an embodiment may be a device that tries to connect to the network apparatus 100 for the first time or a device that has previously connected to the network apparatus 100 through a default account.

In operation S1001, the user device 200 may connect to the network apparatus 100. At this time, the user device 200 may connect to the network apparatus 100 using a personalized account or a default account.

In operation S1003, the network apparatus 100 may facilitate the user device 200 to connect to an external network by using SSID.

In operation S1011, the user device 200 may transmit a log-in request for logging in the first service provider server 20a to the first service provider server 20a.

In operation S1015, the first service provider server 20a may create first authentication information for authentication in the first service provider server 20a.

In operation S1025, the first service provider server 20a may transmit the first authentication information to the user device 200.

In operation S1031, the user device 200 may receive the first authentication information from the first service provider server 20a.

In operation S1041, the user device 200 may transmit a request for creating a new account to the network apparatus 100.

For example, the network apparatus 100 may facilitate the user device 200 to display a user interface for setting a new SSID, in response to the request for creating the new account.

Accordingly, the user device 200 may display a user interface for setting a new SSID, and provide a name of a new account to the network apparatus 100 based on an input for the new account.

In operation S1043, the network apparatus 100 may create a first account in response to the request for creating the new account.

In operation S1051, the user device 200 may transmit first authentication information to the network apparatus 100.

In operation S1053, the network apparatus 100 may receive the first authentication information from the user device 200.

In operation S1063, the network apparatus 100 may connect the first authentication information to the first account, and store the first authentication information the first account. Also, the network apparatus 100 may connect the first authentication information to a first account for logging in the first service provider server 20a, and store the first authentication information associated with the first account below the first account.

Figure 11:
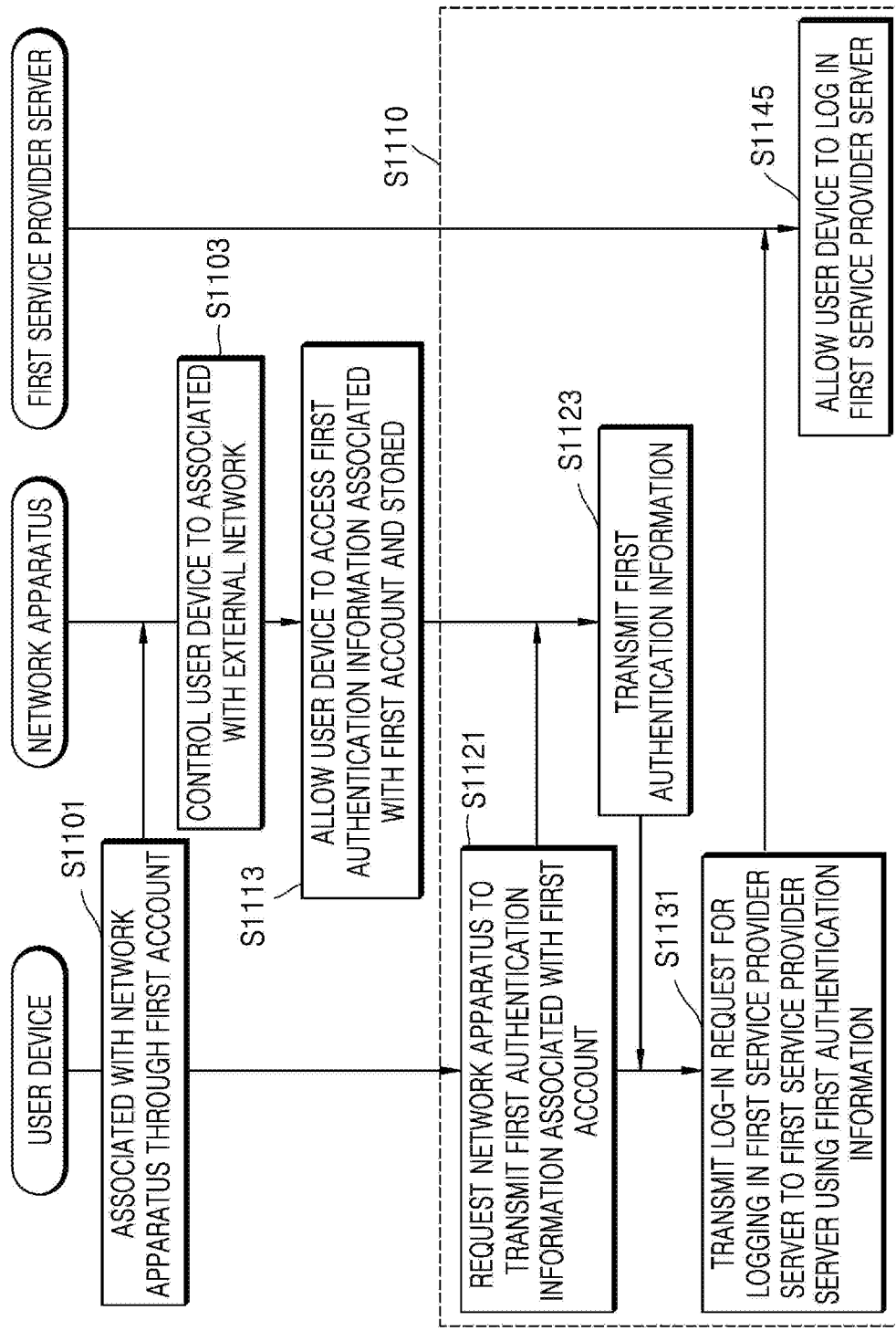
FIG. 11 is a flowchart showing operations between a user device, a network apparatus, and a first service provider server, according to an embodiment.

FIG. 11 is a flowchart showing operations between a user device, a network apparatus, and a first service provider server, according to an embodiment.

The user device 200 according to an embodiment may be one of a plurality of devices capable of connecting to the network apparatus 100 using the first account. Also, the network apparatus 100 according to an embodiment may be an apparatus that connects the first authentication information created by the first service provider server 20a to the first account and stores the first authentication information associated with the first account.

In operation S1101, the user device 200 may connect to the network apparatus 100 through the first account.

In operation S1103, the network apparatus 100 may facilitate the user device 200 to connect to an external network.

In operation S1113, the network apparatus 100 may allow the user device 200 to access the first authentication information associated with the first account and stored.

The network apparatus 100 may facilitate the user device 200 to perform authentication in the first service provider server 20a using the first authentication information.

In operation S1121, the user device 200 may request the network apparatus 100 to transmit the first authentication information associated with the first account. When there is the first authentication information for the first service provider server 20a associated with the first account, the user device 200 may request the network apparatus 100 to transmit the first authentication information.

In operation S1123, the network apparatus 100 may transmit the first authentication information to the user device 200.

In operation S1131, the user device 200 may transmit a log-in request for logging in the first service provider server 20a to the first service provider server 20a using the first authentication information associated with the first account.

In operation S1145, the first service provider server 20a may allow the user device 200 to log in the first service provider server 20a. The first service provider server 20a may receive the first authentication information, and when the first service provider server 20a completes authentication for the user of the user device 200, the first service provider server 20a may allow the user device 200 to log in.

The facilitate method according to the embodiment may be implemented in the form of program instructions that can be executed through various computer means, and stored in a computer readable recording medium. The computer readable recording media may also include, alone or in combination with the program instructions, data files, data structures, or the like. The program instructions recorded on the medium may be those specially designed and constructed for the present disclosure, or they may be of the kind well-known and available to those having skill in the computer software arts. Examples of the computer readable recording medium include: magnetic media such as hard disks, floppy disks, or magnetic tape; optical media such as CD ROMs and DVDs; magneto-optical media such as floptical disks; and hardware devices that are specially configured to store and perform program instructions, such as read-only memory (ROM), random access memory (RAM), flash memory, or the like. Examples of the program instructions include both machine code, such as produced by a compiler, or files containing higher level code that may be executed by the computer using an interpreter.

The disclosure and its advantages have been described with reference to specific embodiments. However, one of ordinary skill in the art appreciates that various changes and modifications can be made without departing from the scope of the disclosure disclosed in the following claims. Accordingly, the detailed description and the drawings should be regarded as illustrative rather than limiting, and it should be understood that all possible modifications are included in the scope of the disclosure.

What is claimed is:

1. A network apparatus which connects an internal network and facilitates a user device to connect to an external network, comprising:
 a memory configured to store one or more instructions and a default account with corresponding default password, the default account facilitating connection to the network apparatus by the user device; and
 a processor configured to execute the one or more instructions stored in the memory to:
  create a first account based on a request for creating a new account from a first user device,
  associate first authentication information with the first account and store the first authentication information in association with the first account in the memory, the first authentication information being information received from the first user device for authentication with a first service provider server on the external network,
  allow a second user device connected to the network apparatus using the first account instead of the default account to access the first authentication information associated with the first account in the memory, and
  facilitate the second user device to perform authentication with the first service provider server based on the first authentication information.

2. The network apparatus of claim 1, wherein the processor is further configured to execute the one or more instructions to allow the second user device to access data associated the first account among data stored in the memory based on the second user device being connected to the network apparatus using the first account.

3. The network apparatus of claim 1, wherein the processor is further configured to execute the one or more instructions to facilitate the first user device and the second user device to connect to the external network so that the first user device and the second user device can transmit and receive data to and from the first service provider server through the external network.

4. The network apparatus of claim 1, wherein the processor is further configured to execute the one or more instructions to:
 facilitate connection with the first user device using the first account,
 receive, from the first user device, second authentication information for authentication with a second service provider, and
 associate the second authentication information with the first account and store the second authentication information in association with the first account in the memory.

5. The network apparatus of claim 1, wherein the processor is further configured to execute the one or more instructions to transmit the first authentication information associated with the first account to the second user device based on a request from the second user device using the first account.

6. The network apparatus of claim 1, wherein the processor is further configured to execute the one or more instructions to:
 facilitate a connection with a third user device using a default account,
 create a second account based on a request for creating a new account is received from the third user device, and
 associate third authentication information with the second account and store the third authentication information in association with the second account in the memory, the third authentication information being information received from the third user device for authentication with the first service provider server, and
 wherein the third user device is connected to the network apparatus using the second account.

7. The network apparatus of claim 6, wherein the processor is further configured to execute the one or more instructions to:
 facilitate a connection with the third user device using the second account, and
 transmit the third authentication information to the third user device, in response to a log-in request for logging in the first service provider server from the third user device.

8. The network apparatus of claim 6, wherein the processor is further configured to execute the one or more instructions to allow the third user device, which is connected to the network apparatus through the second account, to access data associated with the second account among data stored in the memory.

9. The network apparatus of claim 1, wherein the processor is further configured to:
 receive new first authentication information for authentication with the first service provider server from the first user device connected to the network apparatus using the first account, and
 update the first authentication information with the new first authentication information and store the updated first authentication information in the memory.

10. The network apparatus of claim 1, wherein the memory is further configured to store information corresponding to the first account, information corresponding to first service provider associated with the first service provider server, user identification information for authentication with the first service provider server, information corresponding to the network apparatus, and information about data access authority of the first service provider server.

11. A method performed by a network apparatus which connects an internal network and facilitates a user device to connect to an external network, the method comprising:
 creating a first account based on a request for creating a new account from a first user device,
 associating first authentication information with the first account and storing the first authentication information in association with the first account in a memory, the first authentication information being information received from the first user device for authentication with a first service provider server on the external network,
 allowing a second user device to connect to the network apparatus using the first account instead of a default account which would otherwise connect the second user device to the network apparatus,
 allowing the second user device to access the first authentication information associated with the first account in the memory, and
 facilitating the second user device to perform authentication with the first service provider server based on the first authentication information.

12. The method of claim 11, further comprising:
 allowing the second user device to access data associated with the first account among data stored in the memory based on the second user device being to the network apparatus using the first account.

13. The method of claim 11, further comprising:
 facilitating the first user device to connect to the external network so that the first user device can transmit and receive data to and from the first service provider server through the external network; and facilitating the second user device to connect to the external network so that the second user device can transmit and receive data to and from the first service provider server through the external network.

14. The method of claim 11, further comprising:

facilitating the first user device to connect to the network apparatus using the first account;

receiving, from the first user device, second authentication information for authentication with a second service provider; and associating the second authentication information with the first account and storing the second authentication information in association with the first account in the memory.

15. The method of claim 11, wherein the facilitating of the second user device to perform the authentication with the first service provider server by using the first authentication information comprises transmitting the first authentication information associated with the first account to the second user device based on a request from the second user device using the first account.

16. The method of claim 11, further comprising:

facilitating a third user device to connect to the network apparatus using a default account, creating a second account based on a request for creating a new account is received from the third user device, and associating third authentication information with the second account and storing the third authentication information in association with the second account in the memory, the third authentication information being information received from the third user device for authentication with the first service provider server, and wherein the third user device is connected to the network apparatus using the second account.

17. The method of claim 16, further comprising:

facilitating the third user device to connect to the network apparatus using the second account; and transmitting the third authentication information to the third user device, in response to a request from the third user device.

18. The method of claim 16, further comprising: allowing the third user device, which is connected to the network apparatus through the second account, to access data associated with the second account among data stored in the memory.

19. The method of claim 11, further comprising:

receiving new first authentication information for authentication with the first service provider server from the first user device connected to the network apparatus using the first user account; and updating the first authentication information with the new first authentication information and storing store the updated first authentication information in the memory.

20. A non-transitory computer-readable recording medium having stored thereon a computer program to execute a method performed by a network apparatus which connects an internal network and facilitates a user device to connect to an external network, the method comprising:

creating a first account based on a request for creating a new account from a first user device, associating first authentication information with the first account and storing the first authentication information in association with the first account in a memory, the first authentication information being information received from the first user device for authentication with a first service provider server on the external network, allowing a second user device to connected to the network apparatus using the first account instead of a default account which would otherwise connect the second user device to the network apparatus, allowing the second user device to access the first authentication information associated with the first account in the memory, and facilitating the second user device to perform authentication with the first service provider server based on the first authentication information.

* * * * *